United States Patent
Murahashi

(10) Patent No.: US 8,155,834 B2
(45) Date of Patent: Apr. 10, 2012

(54) TRAVELING DRIVE UNIT FOR WORKING VEHICLE

(75) Inventor: Takayoshi Murahashi, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 338 days.

(21) Appl. No.: 12/595,013

(22) PCT Filed: May 26, 2008

(86) PCT No.: PCT/JP2008/060099
§ 371 (c)(1),
(2), (4) Date: Oct. 7, 2009

(87) PCT Pub. No.: WO2009/016884
PCT Pub. Date: Feb. 5, 2009

(65) Prior Publication Data
US 2010/0140020 A1 Jun. 10, 2010

(30) Foreign Application Priority Data
Jul. 30, 2007 (JP) .................................. 2007-197481

(51) Int. Cl.
*B60K 17/14* (2006.01)
*B60K 11/02* (2006.01)
(52) U.S. Cl. ............. 701/36; 701/50; 184/26; 180/65.6; 180/339
(58) Field of Classification Search .................... 701/36, 701/50; 180/339, 65.6, 65.7; 192/113.3, 192/70.12; 184/26; 74/607
See application file for complete search history.

(56) References Cited

U.S. PATENT DOCUMENTS

| | | | |
|---|---|---|---|
| 3,770,074 A * | 11/1973 | Sherman | 180/65.6 |
| 4,799,564 A | 1/1989 | Iijima et al. | |
| 5,372,213 A | 12/1994 | Hasebe et al. | |
| 2008/0296121 A1* | 12/2008 | Miyazaki et al. | 192/113.3 |
| 2010/0187042 A1* | 7/2010 | Murahashi et al. | 184/6.3 |
| 2010/0187043 A1* | 7/2010 | Murahashi et al. | 184/6.3 |
| 2010/0187044 A1* | 7/2010 | Nabeshima et al. | 184/26 |
| 2010/0191417 A1* | 7/2010 | Murahashi et al. | 701/36 |

FOREIGN PATENT DOCUMENTS

| | | |
|---|---|---|
| JP | 62-221918 A | 9/1987 |
| JP | 5-169985 A | 7/1993 |
| JP | 9-177952 A | 7/1997 |
| JP | 2002-54848 A | 2/2002 |
| JP | 2002-340160 A | 11/2002 |
| JP | 2006-264394 A | 10/2006 |
| JP | 2007-2919 A | 1/2007 |

* cited by examiner

Primary Examiner — Ruth Ilan
(74) Attorney, Agent, or Firm — Mattingly & Malur, PC

(57) ABSTRACT

A lubricant circulation pump (46) which is driven by an electric motor (47) is provided in the course of a circulation path (41A, 41B) for circulating lubricant oil to a wheel mounting case (19) which is rotated together with a rear wheel (7). Turning on and off the lubricant circulation pump is controlled according to rotational speed of the rear wheel. When lubricant oil in the wheel mounting case sticks on inner peripheral surfaces thereof under the influence of centrifugal force as a result of the increased vehicle speed, the electric motor is turned off to suspend operation of the lubricant circulation pump. Consequently, the lubricant circulation pump does not suck lubricant oil in the wheel mounting case through an inlet opening (42A) of an intake pipe (42), thereby preventing the lubricant circulation pump from being put in a dry idling operation.

6 Claims, 19 Drawing Sheets

TRAVELING DRIVE UNIT FOR WORKING VEHICLE

TECHNICAL FIELD

This invention relates to a traveling drive unit for working vehicle such as a transportation vehicle and dump truck which is suitably used in transporting crushed stones excavated from a mine or the like, and more particularly to a traveling drive unit for working vehicle, incorporating a reduction gear mechanism to increase the driving torque at the time of traveling.

BACKGROUND ART

Generally, large-size transportation vehicles, called dump trucks, have a liftable vessel (a loading platform) on a frame of a vehicle body, and carry heavy objects to be transported like crushed stones in a state in which the objects to be transported are loaded in a large quantity on the vessel.

In this regard, for example, a traveling drive unit which is adapted to drive a drive wheel of a dump truck is provided with a tubular axle housing which is mounted on a vehicle body, a drive source such as an electric motor or a hydraulic motor which is provided in the axle housing and rotationally drives a rotational shaft, wheel mounting case rotatably mounted around an outer periphery on the fore end side of the axle housing through a bearing to support a drive wheel thereon, and a multi-stage reduction gear mechanism incorporated into the wheel mounting case to transmit rotation of the rotational shaft to the wheel mounting case at a reduced speed (e.g., see Japanese Patent Laid-Open No. S62-221918 A and 2006-264394 A).

By a multi-stage reduction gear mechanism of this sort, rotational output of a drive source like electric motor, for example, is reduced in speed and transmitted to a tubular wheel mounting case (wheel) to generate a large torque in a drive wheel of a dump truck, i.e., in a front or rear wheel. In addition, a traveling drive unit for a dump truck is normally adapted to rotationally drive left and right wheels by respective reduction gear mechanisms independently of each other.

In order to keep each gear member of the reduction gear mechanism in a lubricated state, lubricant oil is pooled in a tubular wheel mounting case on which a drive wheel is to be mounted. Lubricant oil is forcibly circulated into and out of the wheel mounting case (axle housing) by the use of a lubricant circulation pump or the like, and an oil cooler is provided in the course of a circulation path to cool down the lubricant oil.

In this case, for example, a lubricant circulation pump is located on the outer side of an axle housing. An intake side of the lubricant circulation pump is connected to an intake pipe, with the other side (inlet opening side) of the intake pipe being extended into and immersed in lubricant oil pooled in the wheel mounting case. On the other hand, an output side of the lubricant circulation pump is connected to an output pipe or a supply pipe, and the other side of the supply pipe is disposed so as to be extended into the wheel mounting case at a position above the intake pipe.

In this regard, in the case of the prior art mentioned above, when a wheel is put in high speed rotation, namely, when the vehicle speed is increased, the lubricant oil which is pooled in the wheel mounting case behaves to stick on the entire inner peripheral surfaces of the wheel mounting case under the influence of centrifugal force resulting from the rotation of the wheel mounting case. For this reason, the surface level of the lubricant oil in the wheel mounting case drops below the inlet opening of the intake pipe.

Therefore, when a vehicle speed of a working vehicle like dump trucks is increased, an inlet opening of an intake pipe in a wheel mounting case may be relatively dislocated to a position above the surface level of lubricant oil, disabling the lubricant circulation pump to suck in lubricant oil. Besides, in such a case, the lubricant circulation pump is put in a dry idling operation, which would cause premature abrasive wear and damages to seals and bearings of the lubricant circulation pump more and as a result would shorten the service life of the pump itself.

DISCLOSURE OF THE INVENTION

In view of the above-discussed problem with the prior art, it is an object of the present invention to provide a traveling drive unit for working vehicle, which is arranged to turn on and off a lubricant circulation pump according to vehicle speeds thereby preventing dry idling operations of the lubricant circulation pump and ensuring longer service life of the pump.

(1) In order to achieve the above-stated object, according to the present invention, there is provided a traveling drive unit for working vehicle, having a tubular wheel mounting case to be put in rotation integrally with a wheel for working vehicle, a reduction gear mechanism provided in the wheel mounting case and adapted to reduce rotational speed in transmitting rotation of a drive source to the wheel mounting case, and a lubricant oil circulation means for supplying lubricant oil to the reduction gear mechanism.

The present invention is characterized in that the lubricant oil circulation means is comprised of an electric motor, a lubricant circulation pump which is rotationally driven by the electric motor to forcibly circulate lubricant oil pooled in the wheel mounting case, and a motor control means adapted to turn on and turn off the electric motor according to rotational speed of the wheel.

With the arrangements just described, when the rotational speed of a wheel (vehicle speed) is lower than a predetermined reference speed, for example, the electric motor is turned on to drive the lubricant circulation pump, thereby forcibly circulating lubricant oil pooled in a wheel mounting case. Thus, for example, the temperature of lubricant oil circulating to and from the wheel mounting case through circulation paths can be lowered by way of an oil cooler, and lubricant oil of a lower temperature can be supplied to a reduction gear mechanism within the wheel mounting case, ensuring higher performance quality in lubricative and cooling effects.

On the other hand, when the rotational speed of the wheel (vehicle speed) becomes higher than a reference speed in such a situation, lubricant oil in the wheel mounting case behaves in such away as to stick on the entire inner peripheral surfaces of the wheel mounting case under the influence of centrifugal force, disabling the lubricant circulation pump to suck in lubricant oil. In such a case, the motor control means turns off the electric motor to suspend the operation of the lubricant circulation pump, preventing dry idling operations of the lubricant circulation pump to protect seals and bearings of the lubricant circulation pump against abrasive wear and damages, ensuring longer service life of the pump and at the same time preventing deteriorations of lubricant oil.

(2) According to the present invention, a tubular axle housing extending in the left and right direction is mounted on lower side of a vehicle body constituting the working vehicle, a pair of wheel mounting cases being rotatably provide on an outer peripheral side at both left and right ends of the axle housing respectively, while the lubricant oil being pooled at the bottom of each wheel mounting case; the lubricant oil circulation means includes an intake pipe for sucking lubricant oil in the wheel mounting case by the lubricant circulation pump, and a supply pipe for supplying and circulating lubricant oil sucked by the lubricant circulation pump to the wheel mounting case; and the intake pipe is extended internally of the axle housing and led into the wheel mounting case, its inlet opening being opened in lubricant oil pooled at the bottom of the wheel mounting case.

Thus, when the rotational speed of the wheel (vehicle speed) becomes higher than a reference speed and lubricant oil in the wheel mounting case behaves in such a way as to stick on the entire inner peripheral surfaces of the wheel mounting case under the centrifugal force, the surface level of lubricant oil can be dropped to a level lower than the inlet opening of the intake pipe, disabling the lubricant circulation pump to suck in lubricant oil. Therefore, in such a case, the electric motor is turned off by the motor control means to suspend the operation of the lubricant circulation pump, preventing the latter from being put in a dry idling operation.

(3) According to the present invention, the traveling drive unit further comprises a temperature sensor for detecting temperature of the lubricant oil and a speed sensor for detecting rotational speed of the wheel, the motor control means being adapted to control the electric motor according to detection signals from the temperature and speed sensors.

Therefore, the electric motor is turned off when a temperature of lubricant oil detected from the temperature sensor is low to suppress wasteful power consumption for energy-saving purposes. Accordingly, when the electric motor is at rest, lubricant oil in the wheel mounting case is pushed up by the reduction gear mechanism to keep the latter in a lubricated state instead of being forcibly circulated by the lubricant circulation pump.

Further, as the temperature of lubricant oil rises, the electric motor is turned on to drive the lubricant circulation pump, putting lubricant oil in forced circulation thereby lowering the oil temperature through an oil cooler to ensure a higher performance quality in lubricative effects. As soon as the vehicle speed is increased, the electric motor is turned off to suspend the operation of the lubricant circulation pump, preventing the latter from being put in a dry idling operation to ensure longer service life of the pump in the same way as the invention of claim 1 mentioned above.

(4) According to the present invention, the motor control means is adapted to turn on the electric motor when a temperature of lubricant oil detected by the temperature sensor is higher than a predetermined reference temperature and a speed of the wheel detected by the speed sensor is lower than a predetermined reference speed; and the motor control means is adapted to turn off the electric motor when the detected temperature is lower than the reference temperature or the detected speed is higher than the reference speed.

In this case, the electric motor is turned on to forcibly circulate lubricant oil when a temperature of lubricant oil detected from the temperature sensor is higher than a predetermined reference temperature and a vehicle speed detected from the speed sensor is lower than a predetermined reference speed. Further, the electric motor is turned off when a detected temperature is lower than the reference temperature or when a detected vehicle speed is higher than the reference speed, thereby preventing the lubricant circulation pump from being put in a dry idling operation.

(5) According to the present invention, the motor control means is adapted to control rotational speed of the electric motor variably according to temperatures of lubricant oil detected by the temperature sensor.

In this case, for example, the rotational speed of the electric motor is put in operation at a lower speed when a temperature of lubricant oil is low, decreasing the flow rate of lubricant oil which is circulated by the lubricant circulation pump. As a temperature of lubricant oil becomes higher, the electric motor is operated at a higher speed to increase the flow rate of lubricant oil which is in forced circulation by the lubricant circulation pump, thereby suppressing increases in lubricant oil temperature, for example, by the use of an oil cooler.

(6) According to the present invention, a tubular axle housing extending in the left and right direction is mounted on lower side of a vehicle body constituting the working vehicle, a pair of wheel mounting cases are rotatably provided at both left and right ends of the axle housing respectively, respective temperature sensors are provided at both left and right ends of the axle housing, and a sensor checkout means is adapted to judge a temperature sensor abnormality on the basis of a difference between temperatures of lubricant oil detected by the left and right temperature sensors.

With the arrangements just described, temperatures of lubricant oil detected from the left and right temperature sensors are compared to check out if there is a clear difference between left and right temperatures, permitting to make a judgment easily as to whether or not there is an abnormality or trouble in the left or right temperature sensor. Particularly, abnormalities in sensors can be easily diagnosed from a difference between left and right temperatures of lubricant oil in the case of a traveling drive unit for a dump truck since left and right drive wheels are rotationally driven independently of each other by way of a reduction gear mechanism or the like.

(7) According to the present invention, the traveling drive unit for working vehicle further comprises a temperature sensor for detecting temperature of lubricant oil, a speed sensor for detecting rotational speed of the wheel, and a pressure sensor for detecting output pressure of the lubricant circulation pump, the motor control means being adapted to control the electric motor according to detection signals from the temperature sensor, speed sensor and pressure sensor.

In this case, when a drop is detected in output pressure during operation of the lubricant circulation pump, for example, the electric motor is turned off to suspend the operation of the lubricant circulation pump, presuming that the pump is disabled to suck in lubricant oil. Thus, a detection signal from a pressure sensor is read in as a signal which is relevant to vehicle speed, producing the same operational effects as in the invention of claim 1, for example, in the event of a trouble in a speed sensor.

(8) According to the present invention, the motor control means is adapted to turn on the electric motor when a temperature of lubricant oil detected by the temperature sensor is higher than a predetermined reference temperature and a speed detected by the speed sensor is lower than a predetermined reference speed; the motor control means is adapted to turn off the electric motor when the detected temperature is lower than the reference temperature and the detected speed is higher than the reference speed; and the motor control means is adapted to keep turning on the electric motor when an output pressure is higher than a predetermined reference pressure, and to turn off the electric motor when the output pressure drops below the reference pressure.

With the arrangements just described, the lubricant circulation pump is prevented from being put in a dry idling operation, for example, due to deficiency of lubricant oil, thus preventing dry idling operations more stably by the use of a pressure sensor and speed sensor.

DESCRIPTION OF REFERENCE NUMERALS

Figure 1:
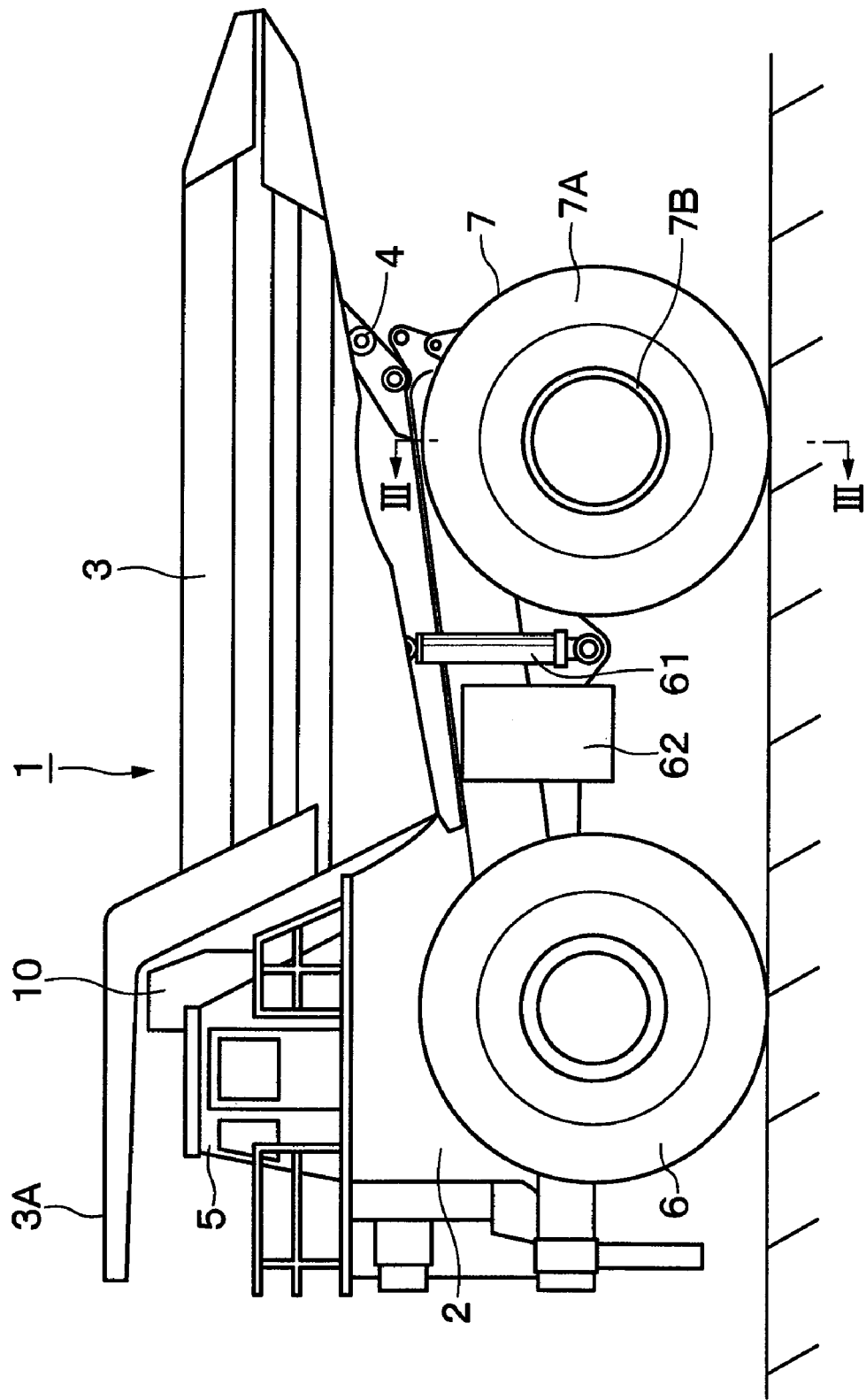
FIG. 1 is a front view of a dump truck incorporating a traveling drive unit according to a first embodiment of the present invention.

1: Dump truck (working vehicle)
2: Vehicle body
3: Vessel
5: Cabin
6: Front wheel
7: Rear wheel (wheel)
8: Engine
9: Main power generator
10: Electric power control unit
11: Traveling drive unit
12: Axle housing
13: Suspension tube
14: Motor casing tube
15: Tubular spindle
17: Wheel drive motor (a drive source)
18: Rotational shaft
19: Wheel mounting case
20, 21: Bearings
22: Outer drum
23: Planetary gear reduction mechanism of a first stage (a reduction gear mechanism)
31: Planetary gear reduction mechanism of a second stage (a reduction gear mechanism)
41: Lubricant oil circulation device (lubricant oil circulation means)
41A, 41B: Left and right circulation paths
42, 43: Intake pipes
42A: Inlet opening
44, 45: Supply pipes
46: Lubricant circulation pump
47: Pump drive motor (electric motor)
48: Filter
49: Oil cooler (heat exchanger)
52: Pressure sensor
53: Temperature sensor
55: Speed sensor
56: Vehicle controller (motor control means)
57: Indicator

BEST MODE FOR CARRYING OUT THE INVENTION

Hereafter, with reference to the accompanying drawings, the traveling drive unit for working vehicle according to the present invention is described more particularly by way of its preferred embodiments which are applied to a rear drive type dump truck.

Shown in FIGS. 1 through 8 is a first embodiment of the present invention, i.e., a traveling drive unit for a working vehicle.

In the drawings, indicated at 1 is a dump truck adopted in the first embodiment as a typical working vehicle. As shown in FIG. 1, the dump truck 1 is built with a sturdy frame structure, and largely constituted by an automotive vehicle body 2 with front and rear wheels 6 and 7, and a vessel 3 which is liftably mounted on the vehicle body 2 as a load-carrying platform.

Further, the vessel 3 is formed as a large-size container whose overall length reaches as much as 10 to 13 meters to load a large volume of heavy load such as crushed stones or other similar objects, and its rear side bottom portion is liftably (tiltably) coupled to a rear end side of the vehicle body 2 by using a pin coupling portion 4 and the like. Further, protector 3A is projected forward from a front top of the vessel 3 in such a way as to cover a cabin 5 from upper side, which will be described hereinafter.

Indicated at 5 is a cabin which is built on a front portion of the vehicle body 2 and positioned to the lower side of the protector 3A. The cabin 5 defines an operating room to be occupied by an operator of the dump truck 1, and internally equipped with an operator's seat, a start-up switch, an accelerator pedal, a brake pedal, and a steering handle along with a plural number of control levers (none of which are shown in the drawings).

The protector 3A of the vessel 3 is arranged to cover the cabin 5 almost entirely from upper side to protect the latter from flying stones or rocks, and to protect an operator in the cabin 5 in case of an overturn accident of the vehicle (the dump truck 1).

Indicated at 6 are left and right front wheels which are rotatably mounted on low front portions of the vehicle body 2. Each one of the front wheels 6 constitutes a steering wheel which is steered by an operator of the dump truck 1 (by steering actions of an operator). Similarly to rear wheels 7 which will be described below, the front wheels 6 are large in diameter (in outside tire diameter), for example, as large as 2 to 4 meters.

Indicated at 7 are left and right rear wheels which are rotatably mounted on low rear portions of the vehicle body 2. Each one of the rear wheels 7 constitutes a drive wheel of the dump truck 1, and is rotationally driven integrally with a wheel mounting case 19 by a traveling drive unit 11 of FIGS. 3 and 4, which will be described hereinafter. Each one of the rear wheels 7 is constituted by a tire 7A and a rim 7B which is arranged to be disposed at the inner side of the tire 7A.

Figure 2:
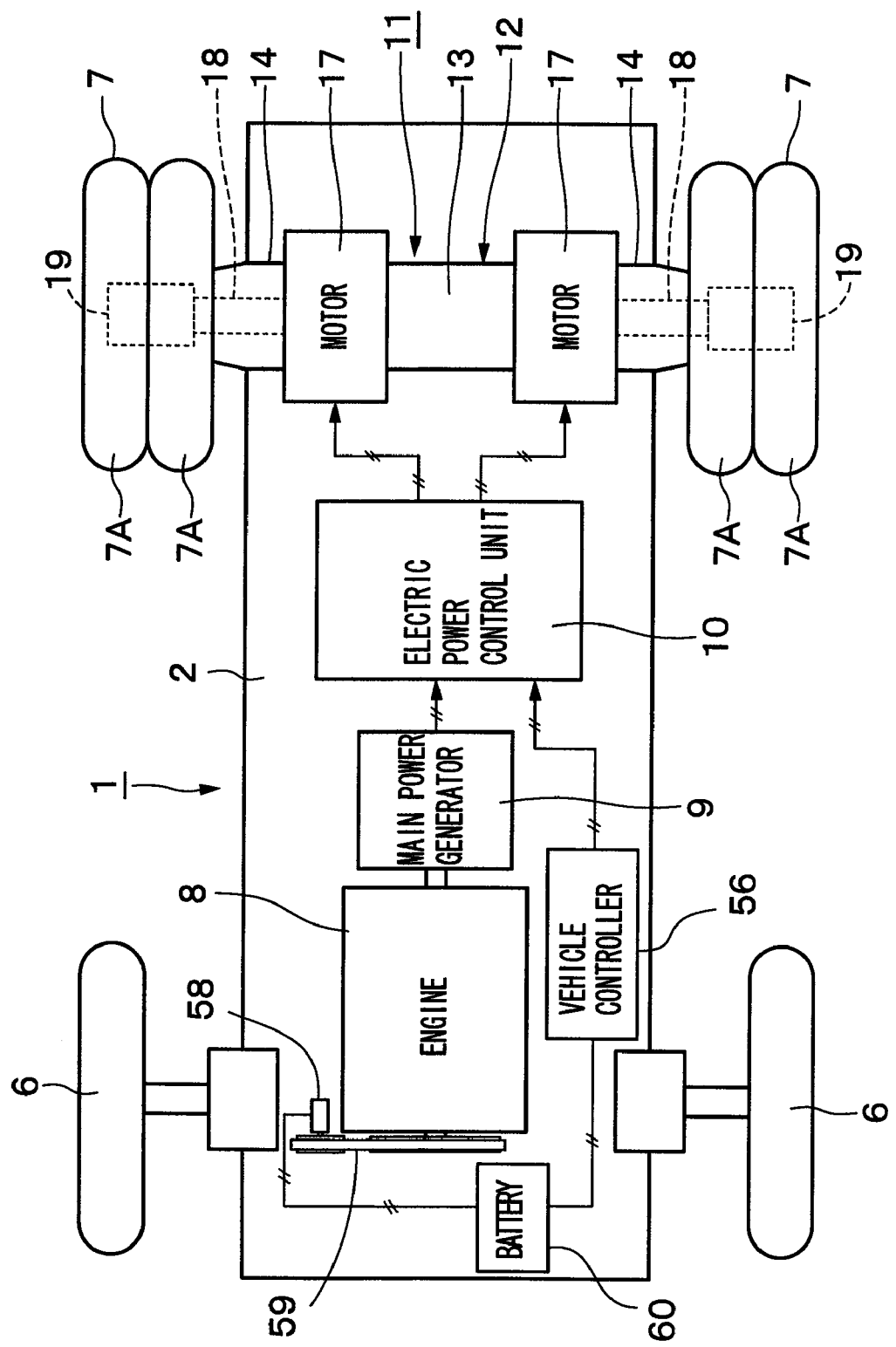
FIG. 2 is a configuration diagram of the traveling drive unit of the dump truck.

Denoted at 8 is an engine which is mounted on the vehicle body 2 under the cabin 5 to serve as a prime mover. This engine 8 is, for example, a large Diesel engine, and drives a main power generator 9 as shown in FIG. 2 to generate a three-phase alternating current (e.g., of approximately 1500 kW), as well as an auxiliary power generator 58 for direct current which will be described later on. Further, the engine 8 plays a role of rotationally driving a hydraulic pump of a hydraulic pressure source (not shown) to supply hydraulic oil to and from a vessel lifting cylinder 61 and a steering cylinder (not shown) of a power steering system as well.

Indicated at 10 is an electric power control unit which controls electric power supply to the dump truck 1 together with a vehicle controller 56 which will be described hereinafter. As shown in FIG. 1, the electric power control unit 10 is constituted by a power distribution control board which is erected on the vehicle body 2 at one side of the cabin 5. Further, as shown in FIG. 2, the electric power control unit 10 functions to output electric power generated by the main power generator 9 to a wheel drive motor 17 and a pump drive motor 47 (see FIG. 7) and the like, which will be described later on, according to a control signal from a vehicle controller 56. Rotational speeds of the left and right wheel drive motors 17 in FIG. 2 are controlled separately by feedback control.

Now, following is a description on the traveling drive unit 11 which is adopted in the first embodiment and provided on the rear wheels 7 side of the dump truck 1.

The traveling drive unit 11 is constituted by an axle housing 12, wheel drive motor 17, wheel mounting case 19 and two-stage planetary gear reduction mechanisms 23 and 31, which will be described hereinafter. The traveling drive unit 11 is adapted to reduce the rotational speed of the wheel drive motor 17 through the two-stage planetary gear reduction mechanisms 23 and 31 to drive the rear wheel 7, which is a drive wheel of the vehicle, with a large rotational torque together with the wheel mounting case 19.

Designated at 12 is an axle housing for the rear wheel 7, provided under a rear portion of the vehicle body 2. As shown in FIG. 2, the axle housing 12 is formed in a tubular body which is extended in the axial direction (in leftward and rightward directions). More specifically, the axle housing 12 is composed of an intermediate suspension tube 13 which is attached to the lower side of a rear portion of the vehicle body 2 through a buffer member like a shock absorber (not shown), and a motor casing tube 14 and a tubular spindle 15 which are provided at left and right ends of the suspension tube 13 respectively, as described hereinafter.

Figure 3:
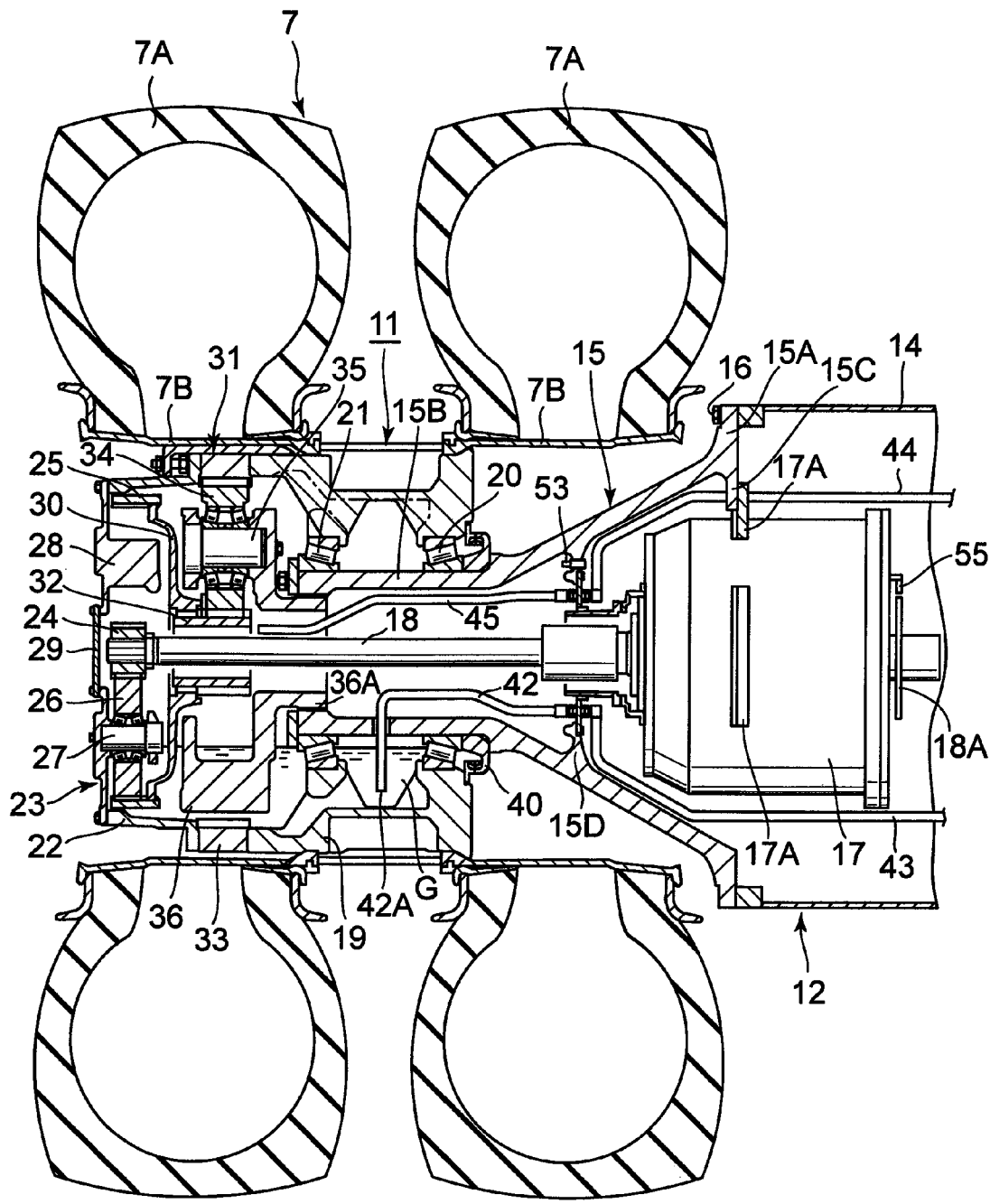
FIG. 3 is an enlarged sectional view taken from the direction of arrows III-III in FIG. 1, showing the traveling drive unit adopted as a rear wheel drive with a wheel cap removed.

Indicated at 14 are motor casing tubes which are provided at the opposite ends of the suspension tube 13 respectively. As shown in FIG. 3, each motor casing tube 14 is formed in a tubular body of a round tubular shape and securely fixed at its inner axial end (at its base end) to the suspension tube 13 by means of bolts or the like. Further, as shown in FIG. 3, the below-described tubular spindle 15 is detachably fixed to the fore end (outer axial end) of the motor casing tube 14 by means of bolts 16 or the like. A wheel drive motor 17 is accommodated in the motor casing tube 14 to serve as a drive source of the rear wheel 7.

Figure 4:
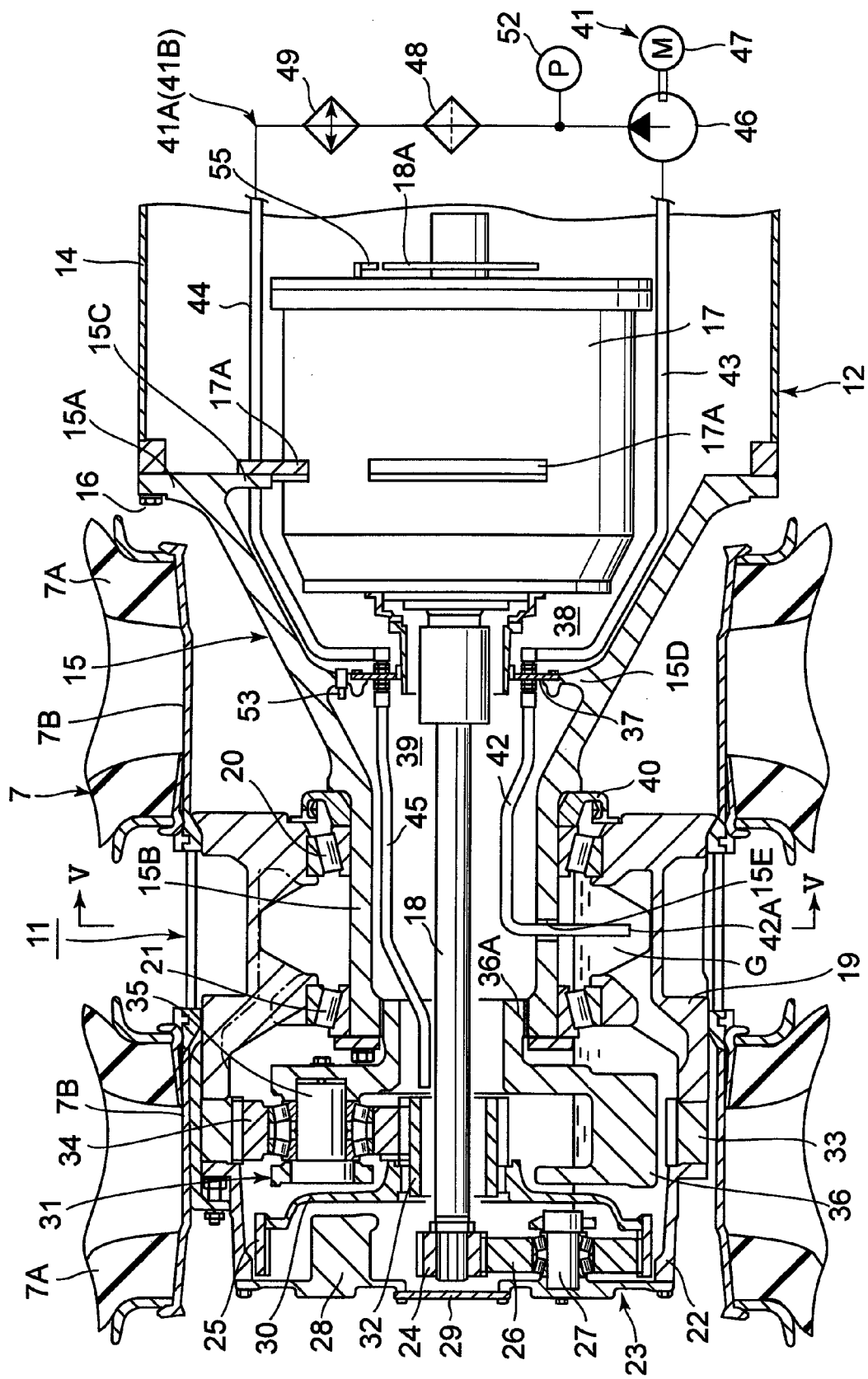
FIG. 4 is a further enlarged sectional view showing a tubular spindle, wheel mounting case, and planetary gear reduction mechanisms.

Indicated at 15 is a tubular spindle, constituting an outermost opening of the axle housing 12. As shown in FIGS. 3 and 4, the tubular spindle 15 is formed in a tubular body of a tapered shape, and fixed to the motor casing tube 14 by the bolts 16 or the like at a large diameter portion 15A at one axial end thereof (inner base end). Further, the fore end (outer axial end) of the tubular spindle 15 forms a small diameter cylinder portion 15B, and a carrier 36 of a final stage, which will be described hereinlater, is fixed on the inner periphery of an opening end portion of the small diameter cylinder portion 15B of the tubular spindle 15.

A wheel mounting case 19 for a rear wheel 7 is mounted on the outer peripheral surface of the small diameter cylinder portion 15B of the tubular spindle 15 through bearings 20 and 21, which will be described hereinafter. Thus, the wheel mounting case 19 is rotatably supported on the small diameter cylinder portion 15B of the tubular spindle 15. Namely, the tubular spindle 15 is provided with a sturdy body in the shape of a stepped tube, and is capable of supporting the wheel mounting case 19 (rear wheel 7) on the outer peripheral side of the small diameter cylinder portion 15B with high rigidity (high strength).

On the other hand, a plural number of mounting seats 15C projecting radially inward (only one of which is shown in the drawing) are integrally formed on the inner peripheral side of the large diameter portion 15A of the tubular spindle 15, and a below-described wheel drive motor 17 is mounted by being fixed on the mounting seats 15C by the use of bolts or the like. As shown in FIGS. 3 and 4, an annular mounting portion 15D projecting radially inward is provided on an inner peripheral side of the tubular spindle 15 at a position between the large diameter portion 15A and the small diameter cylinder portion 15B to mount thereon a partition wall 37, which will be described hereinafter. Further, a radial hole 15E is bored in a lower side portion of the small diameter cylinder portion 15B of the tubular spindle 15 to lead out an intake pipe 42, which will be described later on, in a radially outward direction (i.e., in a downward direction).

Indicated at 17 are left and right wheel drive motors which are detachably provided in the respective tubular spindles 15 of the axle housing 12. Each wheel drive motor 17 is constituted by a large electric motor, and rotationally driven by electric power which is supplied from the electric power control unit 10. Further, as shown in FIG. 2, for rotationally driving the rear wheels 7 independently of each other, the wheel drive motors 17 are accommodated respectively in the left and right motor casing tubes 14 at the opposite sides of the axle housing 12.

In this instance, as shown in FIGS. 3 and 4, the wheel drive motor 17 is provided with a plural number of mounting flanges 17A on its outer peripheral side, the mounting flanges 17A being detachably mounted to amounting seat 15C of the tubular spindle 15 by the use of bolts or the like. Further, each wheel drive motor 17 is provided with a rotational shaft 18 serving as an output shaft which can be driven into rotation in a forward or reverse direction by the wheel drive motor 17.

In this case, the rotational shaft 18 is in the form of an elongated shaft which is extended axially through the small diameter cylinder portion 15B of the tubular spindle 15, with its fore end axially projected out of the tubular spindle 15 as far as a confronting position relative to a lid plate 29, which will be described hereinlater. The rotational shaft 18 is provided with a male spline on the projected distal end to be splined with a sun gear 24 for internal rotation therewith as described in greater detail hereinafter. Further, as shown in FIG. 4, the wheel drive motor 17 is provided with a rotating disk 18A within the motor casing tube 14, the rotating disk 18A being put in rotation integrally with the rotational shaft 18 to serve as an indicant in detection of rotational speed by a speed sensor 55, which will be described later on.

Denoted at 19 is a tubular wheel mounting case which is put in rotation together with the rear wheel 7. This wheel mounting case 19 constitutes what is called a wheel hub, and the rims 7B of the rear wheel 7 are detachably mounted on its outer peripheral side, for example, by press-fitting means. As shown in FIGS. 3 and 4, the wheel mounting case 19 is rotatably mounted on the outer peripheral side of the tubular spindle 15 (the small diameter cylinder portion 15B) through bearings 20 and 21. It should be noted that lubricant oil G is pooled within the wheel mounting case 19, up to a level underneath the small diameter cylinder portion 15B of the tubular spindle 15.

A ring-shaped internal gear 33 and an outer drum 22 which will be described later on are fixed integrally to an axially outer side of the wheel mounting case 19 by the use of long bolts (not shown) or the like. This internal gear 33 is put in rotation together with the wheel mounting case 19. In this instance, rotation of a larger torque caused by reducing the rotation of the wheel drive motor 17 by the below-described planetary gear reduction mechanisms 23 and 31 is transmitted to the wheel mounting case 19 through the ring-shaped internal gear 33. Thus, the wheel mounting case 19 is rotated with a large torque, together with the rear wheel 7 which is a drive wheel of the vehicle.

Indicated at 22 is an outer drum which constitutes part of the wheel mounting case 19 together with the internal gear 33. As shown in FIG. 4, the outer drum 22 is detachably fixed to the wheel mounting case 19 by the use of a plural number of long bolts (not shown) in such away as to sandwich the ring-shaped internal gear 33 therebetween at an axially outer side of the wheel mounting case 19.

Indicated at 23 is a planetary gear reduction mechanism of a first stage constituting a reduction gear mechanism, which is adopted in the first embodiment of the invention. This planetary gear reduction mechanism 23 is located internally of the outer drum 22. As shown in FIGS. 3 and 4, the planetary gear reduction mechanism 23 of the first stage is composed of a sun gear 24 which is splined on a fore end portion of the rotational shaft 18, planetary gears 26, for example, three planetary gears 26 (only one of which is shown in the drawing) which are meshed with the sun gear 24 and a ring-shaped internal gear 25, and put in a rotating movement in step with rotation of the sun gear 24, and a carrier 28 which rotatably supports the respective planetary gears 26 through a support pin 27.

The carrier 28 of the first stage is detachably fixed in its outer peripheral side to an opening end (to an end surface of an axially outer side) of the outer drum 22 by the use of bolts or the like, and rotates integrally with the outer drum 22 (the wheel mounting case 19). Further, a circular lid plate 29 is detachably mounted to the inner peripheral side of the carrier 28, and the lid plate 29 is removed from the carrier 28, for example, at the time of inspection of the sun gear 24 and planetary gears 26.

The ring-shaped internal gear 25 is formed as a tubular gear with a short-diameter so as to circumvent the sun gear 24, planetary gears 26, support pins 27 and carrier 28 radially from outside, and located in an inner peripheral side of the outer drum 22 with a narrow radial gap space therebetween. The teeth of the ring-shaped internal gear 25 are continually meshed with the respective planetary gears 26. Further, the internal gear 25 is attached to a sun gear 32 of a second stage through a coupling 30 which will be described hereinafter.

In this instance, as the sun gear 24 of the planetary gear reduction mechanism 23 of the first stage is rotated integrally by the rotational shaft 18 of the wheel drive motor 17, the rotation of the sun gear 24 is converted into rotating and revolving movements of a plural number of planetary gears 26. Further, rotations of the planetary gears 26 (rotations on their own axes) are transmitted to the ring-shaped internal gear 25, putting the latter in rotation at a reduced speed. The rotation of the internal gear 25 is transmitted to the planetary gear reduction mechanism 31 of the second stage through a coupling 30.

On the other hand, the revolutions or revolving movements of the planetary gear 26 are transmitted to the outer drum 22 by way of rotation of the carrier 28. However, since the outer drum 22 is arranged to rotate integrally with the below-described internal gear 33 of the second stage, the revolutions of the planetary gears 26 are suppressed into synchronization with the rotation of the internal gear 33 (the wheel mounting case 19).

Indicated at 30 is a coupling, i.e., a rotation transmitting member which is arranged to rotate integrally with the internal gear 25 of the first stage. The coupling 30 is in the form of an annular plate which is located in a position between the first planetary gear reduction mechanism 23 of the first stage and the planetary gear reduction mechanism 31 of the second stage, and rotationally coupled with the internal gear 25 of the first stage by means of a spline or the like on the outer peripheral side. On the inner peripheral side, the coupling 30 is rotationally coupled with the sun gear 32 of the second stage by means of a spline or the like.

Thus, by the coupling 30, rotation of the internal gear 25 of the first stage is transmitted to the sun gear 32 of the second stage to put the sun gear 32 in rotation integrally with and at the same speed as the ring-shaped internal gear 25. A plural number of oil holes (not shown) are formed in the coupling 30 to circulate lubricant oil G between front and rear sides of the coupling 30.

Denoted at 31 is a planetary gear reduction mechanism of the second stage constituting a reduction gear mechanism, which is adopted in the second embodiment. This planetary gear reduction mechanism 31 is located between the rotational shaft 18 of the wheel drive motor 17 and the wheel mounting case 19 through the planetary gear reduction mechanism 23 of the first stage to transmit the rotation of the rotational shaft 18 to the wheel mounting case 19 at a reduced speed in cooperation with the planetary gear reduction mechanism 23 of the first stage, thereby producing a large torque in the wheel mounting case 19.

In this case, the planetary gear reduction mechanism 31 of the second stage is composed of a tubular sun gear 32 which is mounted coaxially with the rotational shaft 18 and rotates integrally with the coupling 30, planetary gears 34, for example, three planetary gears 34 (only one of which is shown in the drawing) which are meshed with the sun gear 32 and ring-shaped internal gear 33, and put in rotating movement in step with rotation of the sun gear 32, and a carrier 36 which rotatably supports the respective planetary gears 34 through a support pin 35.

The carrier 36 of the second stage is integrally formed with a tubular fitting portion 36A on its inner peripheral side, in fitting engagement with the small diameter cylinder portion 15B of the tubular spindle 15. This tubular fitting portion 36A is detachably fixed in an inner periphery of the fore end portion of the small diameter cylinder portion 15B in a non-rotatable state through a spline coupling means or the like. The rotational shaft 18 is provided extending in the axial direction in the tubular fitting portion 36A of the carrier 36, along with a fore end portion of a below-described supply pipe 45 with a gap therebetween.

On the other hand, the ring-shaped internal gear 33 of the second stage is formed as a tubular body with a short diameter, and integrally fixed between the wheel mounting case 19 and the outer drum 22 in such a way as to circumvent the sun gear 32, planetary gears 34, support pins 35 and carrier 36 radially from outside. On the inner peripheral side, the ring-shaped internal gear 33 is meshed with the respective planetary gears 34.

In this instance, since the carrier 36 of the planetary gear reduction mechanism 31 of the second stage is fixed to the tubular spindle 15, revolving movements of the planetary gears 34 (rotation of the carrier 36) is restrained. Therefore, as the sun gear 32 of the planetary gear reduction mechanism 31 of the second stage is put in rotation integrally with the coupling 30, the rotation of the sun gear 32 is converted into rotations of a plural number of the planetary gears 34, putting the ring-shaped internal gear 33 in rotation at a reduced speed. As a consequence, by the two-stage speed reduction through the planetary gear reduction mechanisms 23 and 31, a high output of reduced speed, i.e., rotation of a large rotational torque is transmitted to the wheel mounting case 19 on the side of the rear wheel 7.

On the other hand, denoted at 37 is a partition wall which is provided internally of the tubular spindle 15 in the vicinity of the wheel drive motor 17. This partition wall 37 is in the form of an annular partition plate which is fixed to a mounting portion 15D of the tubular spindle 15 by bolts or the like in its outer peripheral side. In this instance, by the partition wall 37, the inner space of the tubular spindle 15 is partitioned into a motor room 38 on one axial side (on the inner side) of the partition wall 37, and a tubular space 39 on the other axial side (on the outer side). The tubular space 39 is constantly held in communication with the inside of the wheel mounting case 19 through the tubular fitting portion 36A of the carrier 36 and inner peripheral side of the sun gear 32.

Indicated at 40 is a seal device which is provided in the vicinity of the bearing 20. This seal device 40 maintains a liquid tight seal between the tubular spindle 15 and the wheel mounting case 19, as shown in FIG. 4, and is constituted by what is called a floating seal. Further, the seal device 40 is adapted to prevent leaks of lubricant oil G which is pooled between the tubular spindle 15 and the wheel mounting case 19, while preventing intrusion of sand, soil and rainwater.

Now, given below is a description on the construction of a lubricant oil circulation means 41 (hereinafter referred to simply as "lubricant oil circulation device 41" for brevity).

The lubricant oil circulation device 41 serves to forcibly circulate lubricant oil to and from inner and outer sides of the wheel mounting case 19, cooling down lubricant oil G in circulation at an oil cooler 49, which will be described hereinafter. The lubricant oil circulation device 41 is composed of intake pipes 42 and 43, supply pipes 44 and 45, lubricant circulation pump 46, pump drive motor 47, filter 48, oil cooler 49 and vehicle controller 56 (see FIG. 7) serving as a motor control means, as described in greater detail hereinafter.

Figure 6:
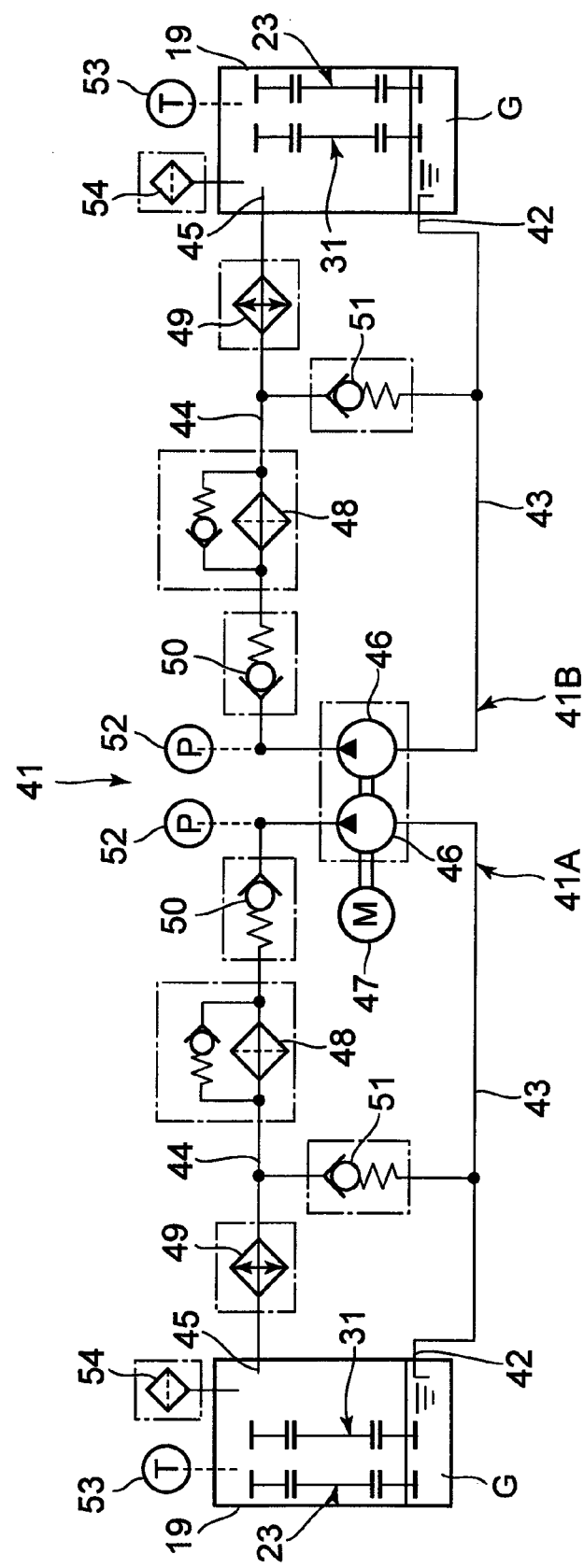
FIG. 6 is a circuit diagram of a lubricant oil circulation device provided on the left and right rear wheels.

In this instance, as shown in FIG. 6, the lubricant oil circulation device 41 is provided with left and right circulation paths 41A and 41B. These circulation paths 41A and 41B are each made up of intake pipes 42 and 43 and supply pipes 44 and 45, which will be described later on. These circulation paths 41A and 41B are provided independently for the left and right wheel mounting cases 19 to circulate lubricant oil G independently, which is pooled in each one of the left and right wheel mounting cases 19, along the left and right circulation paths 41A and 41B by lubricant circulation pumps 46, which will be described hereinafter.

In this case, the lubricant oil circulation device 41 is provided with the left and right circulation paths 41A and 41B respectively and independently for the left and right wheel mounting cases 19. Thus, the supply of lubricant oil G to left and right wheel mounting cases 19 is controlled separately by way of the left and right circulation paths 41A and 41B.

Figure 5:
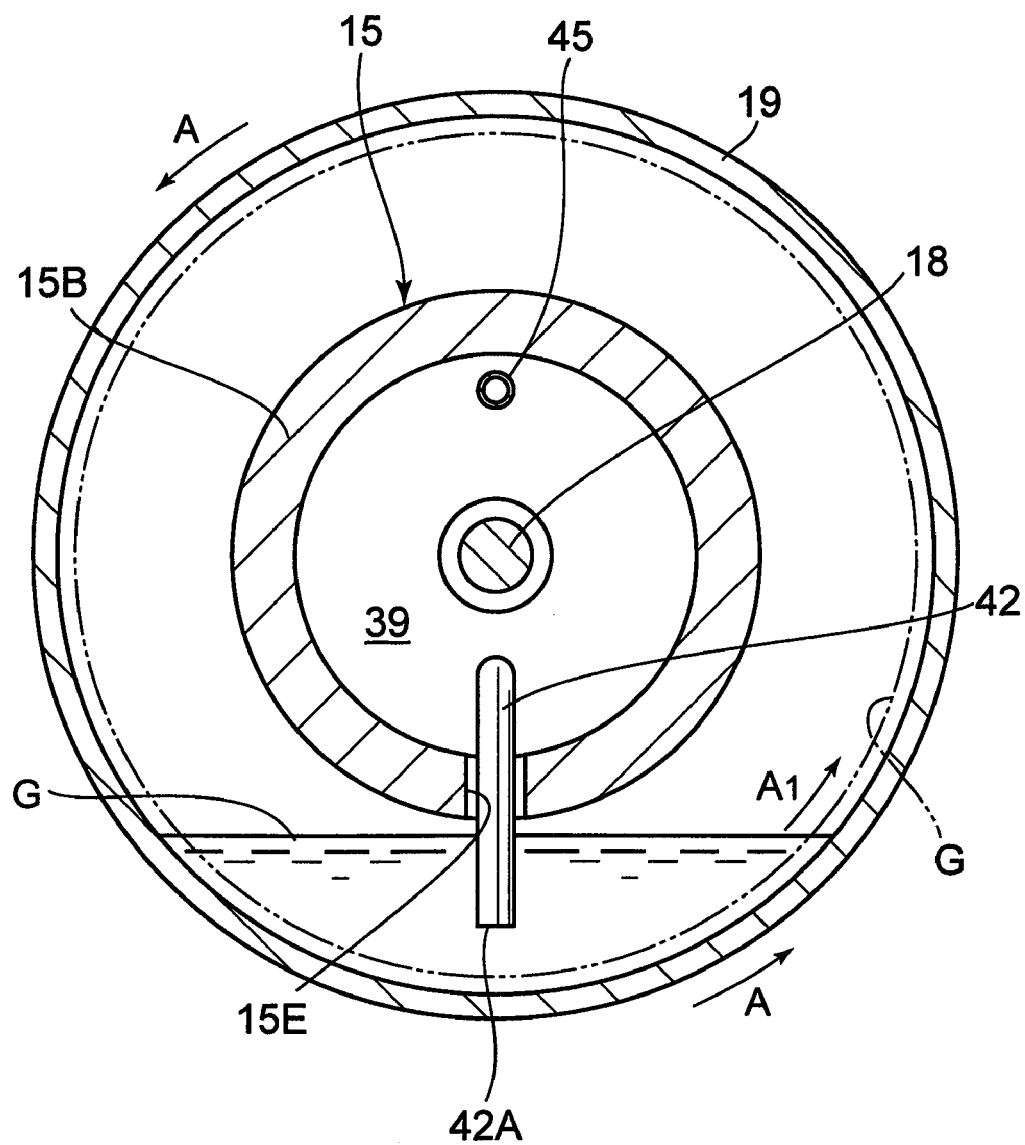
FIG. 5 is an enlarged sectional view taken from the direction of arrows V-V in FIG. 4, showing the tubular spindle, wheel mounting case and intake pipe.

Indicated at 42 is an intake pipe which constitutes an intake side of each one of the circulation paths 41A and 41B. As shown in FIGS. 4 and 5, a fore end side of this intake pipe 42 is extended radially outward (downward) from the small diameter cylinder portion 15B of the tubular spindle 15 through the radial hole 15E of the tubular spindle 15. Further, the bottom end (fore end) of the intake pipe 42 serves as an inlet opening 42A immersed in lubricant oil G which is pooled in a bottom portion of the wheel mounting case 19. Upon turning on a below-described lubricant circulation pump 46, lubricant oil G is sucked into the intake pipe 42 through the inlet opening 42A.

Indicated at 43 is another intake pipe which is located on the side of the motor room 38 of the tubular spindle 15. As shown in FIG. 4, this intake pipe 43 is connected to the base end side of the intake pipe 42 at a position on the partition wall 37, and extended through the motor casing tube 14 toward a lubricant circulation pump 46, which will be described later on. Both of these intake pipes 42 and 43 are connected to an intake side of the lubricant circulation pump 46.

Denoted at 44 and 45 are supply pipes which constitute an output side of the circulation paths 41A and 41B. These supply pipes 44 and 45 are connected to the output side of the lubricant circulation pump 46 to supply lubricant oil G to planetary gear reduction mechanisms 23 and 31 in the wheel mounting case 19. In this instance, the supply pipe 44 is located on the side of the motor room 38 of the tubular spindle 15, and a base end side of the supply pipe 45 is connected to a fore end side of the supply pipe 44 at a position on the partition wall 37. A fore end side of the supply pipe 45 is extended axially through a tubular space of the tubular spindle 15 at a position higher than the rotational shaft 18.

On the other hand, designated at 46 are lubricant circulation pumps which are each rotationally driven by a pump drive motor 47 serving as an electric motor. The lubricant circulation pumps 46 are respectively provided in the left and right circulation paths 41A and 41B as shown in FIG. 6. As the lubricant circulation pump 46 is driven by the pump drive motor 47, lubricant oil G which is sucked in through the intake pipes 42 and 43 is sent forward to the supply pipes 44 and 45 through a filter 48 and an oil cooler 49, which will be described hereinlater.

Denoted at 49 are oil coolers which are provided as heat exchangers in the course of the supply pipes 44, and the oil coolers 49 are disposed in the left and right circulation paths 41A and 41B, respectively. These oil coolers 49 serve to cool down lubricant oil G which is in circulation through the circulation paths 41A and 41B, sending lubricant oil G of approximately room temperature to the supply pipes 45, for example.

Indicated at 50 are pressure retainer valves which are provided in the course of the supply pipes 44, respectively. As shown in FIG. 6, for example, each pressure retainer valve 50 is located on the output side of the lubricant circulation pump 46. For instance, the pressure retainer valve 50 is opened at a cracking pressure of approximately 0.15 MPa to circulate lubricant oil G from the lubricant circulation pump 46 toward the inside of the supply pipe 44. Thus, the pressure retainer valve 50 retains the output pressure of the lubricant circulation pump 46 at a level higher than the lowest pressure (e.g., approximately 0.15 MPa), thereby stabilizing pressure detection by the pressure sensor 52, which will be described hereinafter.

Denoted at 51 are bypass valves which are provided in the course of the circulation paths 41A and 41B, respectively. As shown in FIG. 6, each bypass valve 51 is located between the intake pipe 43 and supply pipe 44, and serves to let an overpressure, which may occur in the supply pipe 44, escape to the side of the intake pipe 43.

Now, given below is a description on various sensors and vehicle controller (motor control means) which are adopted in the first embodiment.

In the first place, indicated at 52 are pressure sensors which serve to detect output pressure P of each lubricant circulation pump 46. As shown in FIG. 6, the pressure sensors 52 are located in the course of the supply pipe 44 between the lubricant circulation pump 46 and pressure retainer valve 50. Besides, the pressure sensors 52 output a signal which is adapted to judge whether or not the lubricant circulation pump 46 is operating in normal conditions, as described hereinafter.

Indicated at 53 are temperature sensors which are provided in the left and right circulation paths 41A and 41B, respectively, and serve to detect the temperature of lubricant oil G. As shown in FIG. 4, for example, each temperature sensor 53 is set on the mounting portion 15D of the tubular spindle 15 to detect the temperature in the tubular space 39 (in the wheel mounting case 19) as a temperature of lubricant oil G. In this instance, more specifically, a temperature sensor 53 is located in each one of the left and right wheel mounting cases 19 as shown in FIG. 6 to detect temperatures of lubricant oil G in the wheel mounting cases 19 separately and independently of each other.

Further, as shown in FIG. 6, an air breather 54 is provided at upper position on each wheel mounting case 19 thereby to keep the internal air pressure of the wheel mounting case 19 approximately at the level of atmospheric pressure, preventing fluctuations in internal air pressure under the influence of variations in internal temperature.

On the other hand, indicated at 55 is a speed sensor which is adapted to detect the output rotation of the wheel drive motor 17. As shown in FIG. 4, this speed sensor 55 is located in the vicinity of a rotating disk 18A on the rotational shaft 18 to detect rotational speed of the rotating disk 18A as a rotational speed of the rear wheel 7 (as a vehicle speed). More specifically, since the rotation of the wheel drive motor 17 (the rotational shaft 18) is transmitted to the rear wheel 7 (to the wheel mounting case 19) at a predetermined reduction ratio (e.g., at a reduction ratio of from 30 to 40) through the multi-stage planetary gear reduction mechanisms 23 and 31, the rotational speed of the rear wheel 7 (the traveling speed of the vehicle) can be detected from the rotational speed of the rotating disk 18A.

Figure 7:
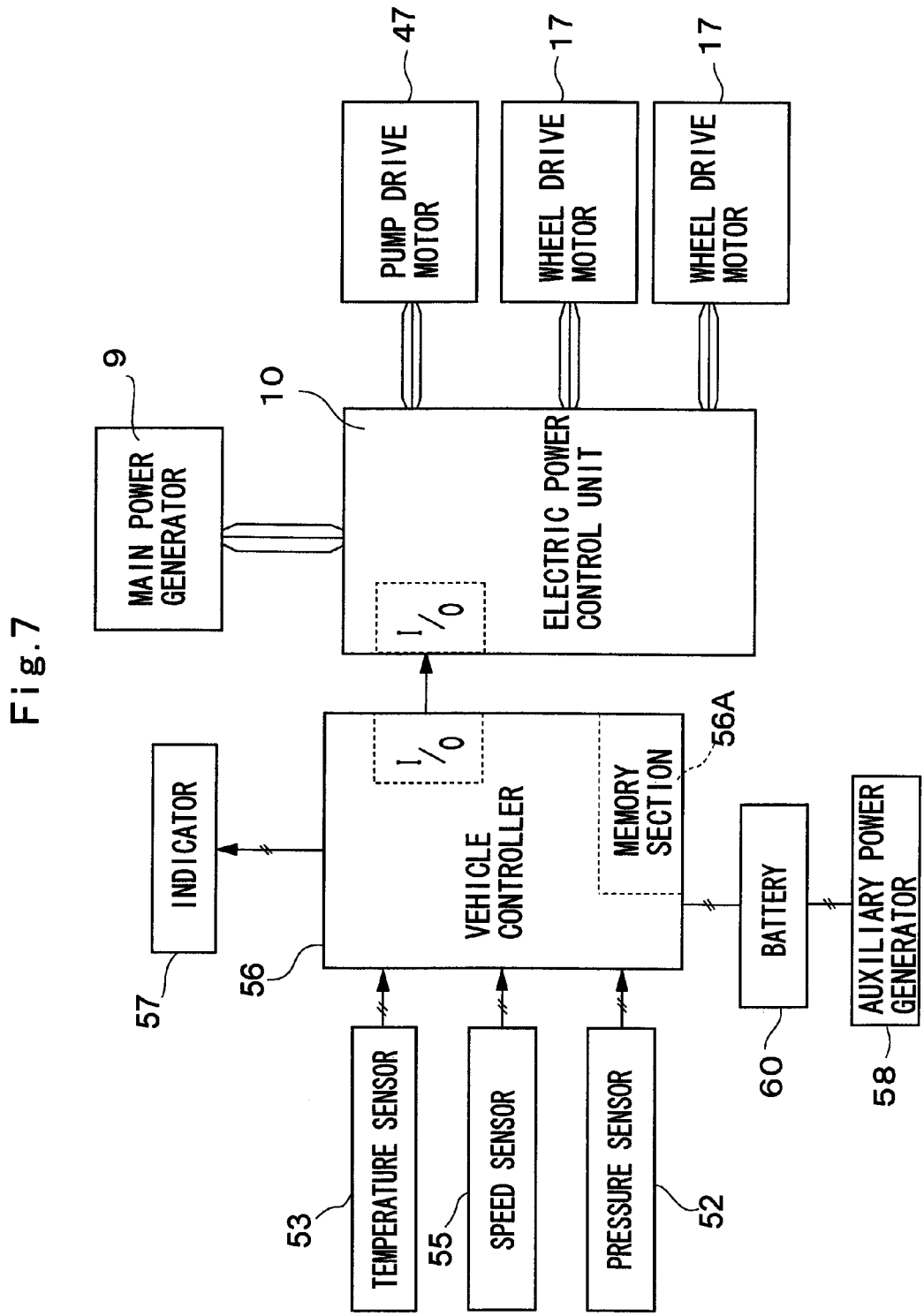
FIG. 7 is a block diagram of a vehicle controller for controlling a supply of lubricant oil.

Indicated at 56 is a vehicle controller serving as a motor control means which is constituted by a microcomputer or the like. As shown in FIG. 7, this vehicle controller 56 is connected with the pressure sensor 52, temperature sensor 53 and speed sensor 55 on its input side, and connected with an indicator 57 on its output side while being connected to the wheel drive motors 17 and pump drive motor 47 through the electric power control unit 10. In this instance, the indicator 57 is set in a suitable position within the cabin 5 of the dump truck 1 of FIG. 1 to indicate or give warning such as abnormality of a sensor to an operator, which will be described later on.

Figure 8:
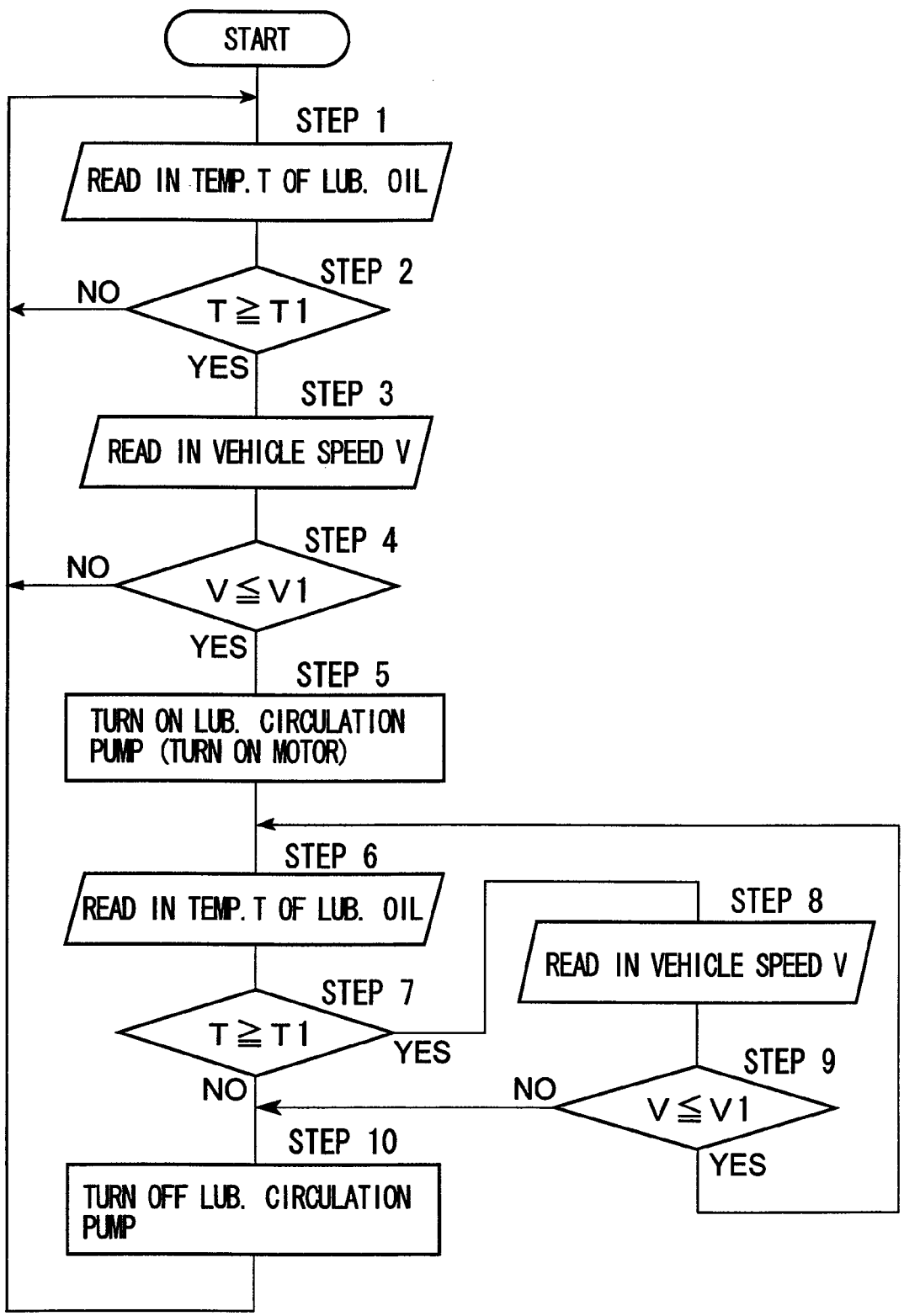
FIG. 8 is a flow chart of a lubricant oil supply control routine adopted in a first embodiment of the present invention.

Further, the vehicle controller 56 is provided with a memory section 56A such as ROM and RAM (including a nonvolatile memory) to store a reference temperature T1 (e.g., T1=40 to 60° C.) and a reference speed V1 (e.g., V1=25 to 35 km/h, as shown in FIG. 8), along with lubricant oil control routine programs to turn on and off the pump drive motor 47.

Indicated at 58 is an auxiliary power generator which is mounted on the vehicle body 2 separately from the main power generator 9. As shown in FIG. 2, this auxiliary power generator 58 is driven by the engine 8 through a belt drive mechanism 59 to generate electric power, for example, a direct current of 24V. The electric power generated by the auxiliary power generator 58 is used for charging a battery 60, which constitutes a power supply source for the vehicle controller 56.

Denoted at 61 is a vessel lifting cylinder which is operative for lifting up and down the vessel 3 of the dump truck 1 of FIG. 1. The vessel lifting cylinders 61 are provided between front wheels 6 and rear wheels 7 of the vehicle body 2 as shown in FIG. 1, one in a left side section and another in a right side section of the vehicle body 2. Further, pressure oil is fed to and from each vessel lifting cylinder 61 to expand and contract same, lifting (tilting) the vessel 3 up and down about the pin coupling portion 4 of the rear end side.

Indicated at 62 is an operating oil tank which is attached to a side surface of the vehicle body 2 below the vessel 3 as shown in FIG. 1. Operating oil in the operating oil tank 62 is pressurized by the above-mentioned hydraulic pump and fed as pressure oil to and from the vessel lifting cylinders 61 and a steering cylinder of a power steering system.

Being arranged as described above, the dump truck 1 of the first embodiment is put in operation in the manner as follows.

In the first place, the engine 8 of FIG. 2 is started by an operator who has climbed into the cabin 5. Whereupon, a main hydraulic pump (not shown), which is a main hydraulic pressure source, is rotationally driven by the engine 8, and at the same time the main and auxiliary power generators 9 and 58 are put in operation to generate electric power. The electric power generated by the auxiliary power generator 58 is charged in the battery 60, while the electric power generated by the main power generator 9 is supplied to the left and right wheel drive motors 17 and the pump drive motor 47 through the electric power control unit 10.

When starting the vehicle, a vehicle drive current is supplied to each one of the wheel drive motors 17 of the rear wheels 7 side from the electric power control unit 10. At this time, the rotational speeds of the left and right wheel drive motors 17 are controlled separately by feedback control by the vehicle controller 56. Thus, the left and right rear wheels 7, i.e., drive wheels of the vehicle, are rotationally driven separately and independently of each other, and driven at the same speed when the vehicle is in travel in a straightforward direction.

Namely, by the traveling drive unit 11 which is provided on the rear wheel 7 side of the dump track 1, the rotation of the wheel drive motor 17 (of the rotational shaft 18) is reduced in speed through the multi-stage planetary gear reduction mechanisms 23 and 31, for example, at a reduction ratio of from 30 to 40, to rotate the rear drive wheel 7 with a large torque together with the wheel mounting case 19. In this way, the left and right rear wheels 7 are driven respectively by the left and right wheel drive motors 17 independently of each other at controlled rotational speeds.

Further, as shown in FIGS. 3 to 5, lubricant oil G is pooled in the wheel mounting case 19, up to a level which is lower than the small diameter cylinder portion 15B of the tubular spindle 15. That is to say, by lowering the surface level of lubricant oil in the wheel mounting case 19, the stirring resistance (viscous resistance) of lubricant oil G resulting from the rotation of the ring-shaped internal gear 25, planetary gears 26 and 34, and coupling 30 can be suppressed to as small a value as possible.

In this instance, as the planetary gear reduction mechanisms 23 and 31 of the first and second stages are put in operation by the rotational shaft 18 of the wheel drive motor 17, lubricant oil G in the wheel mounting case 19 is incessantly pushed up, for example, by the internal gears 25 and 33 of the first and second stages to lubricate the respective planetary gear reduction mechanisms 23 and 31.

Then, as soon as the lubricant circulation pump 46 is driven by the pump drive motor 47 of FIG. 4, lubricant oil G in the wheel mounting case 19 is sucked into the lubricant circulation pump 46 through the inlet opening 42A of the intake pipe 42, and delivered toward the supply pipes 44 and 45. At this time, lubricant oil G is supplied from the fore end side of the supply pipe 45 to the sun gears 24 and 32 of the planetary gear reduction mechanisms 23 and 31, the planetary gears 26 and 34 and the like in a state in which lubricant oil G is cooled down by the oil cooler 49 to keep the respective gears in a lubricated state.

Further, lubricant oil G which has been supplied to the planetary gear reduction mechanisms 23 and 31 of the first and second stages in the wheel mounting case 19 is caused to gradually drip down by gravity while lubricating tooth faces of the respective gears, and is pooled again at the bottom portion of the wheel mounting case 19. Then, the lubricant oil G pooled at the bottom portion of the wheel mounting case 19 is sucked into the lubricant circulation pump 46 through the inlet opening 42A of the intake pipe 42 and delivered to the supply pipes 44 and 45 again.

By the way, while the vehicle (the dump truck 1) is in travel, the wheel mounting case 19 is put in high speed rotation in the direction of arrow A in FIG. 5 along with the rear wheel 7, so that the lubricant oil G pooled in the wheel mounting case 19 is pushed up in the direction of arrow A1 along the inner peripheral surface of the wheel mounting case 19. When the vehicle speed of the dump truck 1 (the vehicle) is increased, the rear wheel 7 is put in high speed rotation together with the wheel mounting case 19, and lubricant oil G in the wheel mounting case 19 is put under the influence of centrifugal force resulting from high speed rotation of the wheel mounting case 19.

As a consequence, as indicated by a two-dot chain line in FIG. 5, lubricant oil G in the wheel mounting case 19 behaves in such away as to stick on the entire inner peripheral surfaces of the wheel mounting case 19, causing the surface level of lubricant oil G to drop below the inlet opening 42A of the intake pipe 42. Thus, when the vehicle speed is increased, the inlet opening 42A of the intake pipe 42 in the wheel mounting case 19 may be relatively dislocated to a position above the surface level of lubricant oil G, disabling the suction action of the lubricant circulation pump 46. Besides, in such a case, the lubricant circulation pump 46 is put in a dry idling operation which would cause premature abrasive wear and damages to seals and bearings to shorten the service life of the pump.

Therefore, in the first embodiment, in order to prevent the lubricant circulation pump 46 from being put in dry idling operation when the vehicle speed is increased, the lubricant circulation pump 46 is turned on and off according to the vehicle speed by the vehicle controller 56, by execution of a lubricant checkout routine program as shown in FIG. 8.

Upon starting the lubricant checkout routine, in Step 1, the temperature in the wheel mounting case 19 is read in from the temperature sensor 53 as a temperature T of lubricant oil G. In next Step 2, a judgment is made as to whether or not the temperature T detected by the temperature sensor 53 has risen to a predetermined reference temperature T1 (e.g., T1=40° C. to 60° C.).

In this instance, the reference temperature T1 is a criterial value to be used in making a judgment as to whether or not lubricant oil G is at such a temperature level as to require forced circulation of lubricant oil G in the wheel mounting case 19 by the lubricant circulation pump 46 for cooling same by way of the oil cooler 49.

As long as the judgment in Step 2 is "NO", it means that the temperature T of lubricant oil G is lower than the reference temperature T1 and there is no necessity for forcibly circulating the lubricant oil G in the wheel mounting case 19 for cooling purposes, and the processing returns to Step 1.

In case the judgment in Step 2 is "YES", it means that the temperature T of lubricant oil G is higher than the reference temperature T1, and lubricant oil G in the wheel mounting case 19 needs forced circulation for cooling purposes. Accordingly, in this case, the vehicle speed V is read in from the speed sensor 55 in Step 3, and a judgment is made in Step 4 as to whether or not the vehicle speed V is lower than a predetermined reference speed V1 (e.g., V1=25 to 35 km/h).

In this instance, the reference speed V1 is a criterial value to be used in making a judgment as to whether or not lubricant oil G in the wheel mounting case 19 is sticking on inner peripheral surfaces thereof, and the lubricant circulation pump 46 is idling in a dry state without sucking in lubricant oil G through the inlet opening 42A of the intake pipe 42.

Generally, the vehicle speed V is lower than the reference speed V1 immediately after starting a vehicle, and the processing goes to a next Step 5. However, in case the vehicle speed V gets higher than the reference speed V1 immediately after starting a vehicle, the judgment in Step 4 is "NO", it means that the detected vehicle speed V is high, and the processing returns to the Step 1 and onwards.

In case the judgment in Step 4 is "YES", it means that the vehicle speed V is lower than the reference speed V1, and the processing goes to a next Step 5 to start the pump drive motor 47, rotationally driving the lubricant circulation pump 46 to forcibly circulate lubricant oil G. Namely, lubricant oil G which is pooled at the bottom portion of the wheel mounting case 19 is sucked into the lubricant circulation pump 46 through the inlet opening 42A of the intake pipe 42 and delivered toward the lubricant supply pipes 44 and 45. At this time, lubricant oil G is cooled down at the oil cooler 49 and then supplied to the sun gears 24 and 32 and planetary gears 26 and 34 of the planetary gear reduction mechanisms 23 and 31 from a fore end side of the supply pipe 45 to keep the respective gears in a lubricated state.

Then, in Step 6, the temperature T of lubricant oil G in the wheel mounting case 19 is read in again from the temperature sensor 53, and in next Step 7, a judgment is made as to whether or not the temperature T of lubricant oil G has become higher than the reference temperature T1. In case the judgment in Step 7 is "YES", the temperature of the lubricant oil G is at a high level which requires to continue forced circulation of lubricant oil G. Therefore, in next Step 8, the vehicle speed V is read in again from the speed sensor 55.

In next Step 9, a judgment is made as to whether or not the vehicle speed V is lower than the reference speed V1. When the judgment in Step 9 is "YES", it means that the vehicle speed V is lower than the reference speed V1, so that the pump drive motor 47 is kept on to rotationally drive the lubricant circulation pump 46, leaving lubricant oil G in the forcibly circulated state when returning to execute Step 6 and onwards.

Further, in case the judgment in Step 7 is "NO", it means that the temperature T of lubricant oil G has become lower than the reference temperature T1, and there is no need to cool down the lubricant oil G in the wheel mounting case 19 by the forced circulation. Therefore, in this case, the processing goes to Step 10 to turn off the pump drive motor 47, that is to say, to suspend the forced circulation of lubricant oil G by the lubricant circulation pump 46. Then, the processing returns to Step 1 again to re-start the checkout routine.

On the other hand, in case the judgment in Step 7 is "YES" and the judgment in Step 9 is "NO", it means that the temperature T of lubricant oil G is at a higher level than the reference temperature T1 and the vehicle speed V is higher than the reference speed V1. In this case, the rear wheel 7 is in high speed rotation together with the wheel mounting case 19, and lubricant oil G in the wheel mounting case 19 is under the influence of centrifugal force resulting from high speed rotation.

Therefore, as indicated by a two-dot chain line in FIG. 5, lubricant oil G in the wheel mounting case 19 behaves in such a way as to stick on the entire inner peripheral surface of the wheel mounting case 19, causing the surface level of lubricant oil G to drop below the inlet opening 42A of the intake pipe 42.

In such a case, the processing goes to Step 10 to turn off the pump drive motor 47 and suspend the operation of the lubricant circulation pump 46. Thus, the lubricant circulation pump 46 is prevented from being put in a dry idling operation which would take place when the inlet opening 42A of the intake pipe 42 in the wheel mounting case 19 is relatively dislocated to a position above the surface level of lubricant oil G by acceleration of the vehicle speed V, eliminating the problem of premature abrasive wear and damages of seals and bearings of the lubricant circulation pump 46 as caused by dry idling operations.

Thus, according to the first embodiment, the operation of the lubricant circulation pump 46 is turned on and off by way of an on-off control of the pump drive motor 47 in relation with the vehicle speed V to prevent idling operations (dry operations) of the lubricant circulation pump 46, thereby ensuring higher durability and longer service life of the lubricant circulation pump 46.

Further, in the present embodiment, the operation of the lubricant circulation pump 46 is turned on and off by way of the pump drive motor 47 depending on whether or not the temperature T of lubricant oil G, detected by the temperature sensor 53, is lower than a reference temperature T1 (e.g., 40° C. to 60° C.). As a consequence, the pump drive motor 47 is turned off when there is no necessity for forced circulation of lubricant oil G in the wheel mounting case 19, suppressing wasteful power consumption for energy saving purposes.

Besides, in such a case, instead of the forced circulation by the lubricant circulation pump 46, lubricant oil G which is pooled in the wheel mounting case 19 is incessantly pushed up by the internal gears 25 and 33 of the first and second planetary gear reduction mechanisms 23 and 31, keeping the respective gears in a lubricated state by what is called a "splash lubrication".

Figure 9:
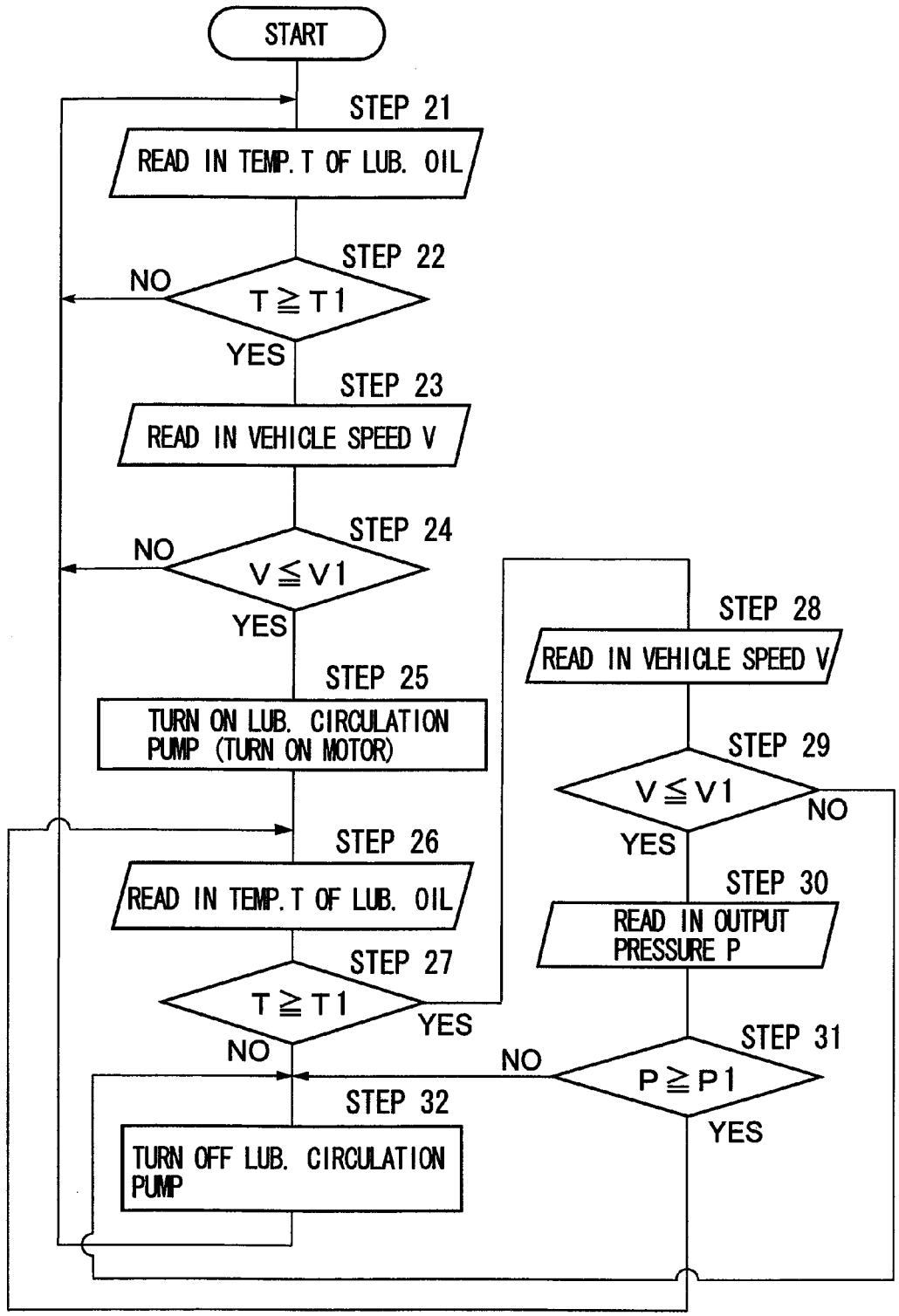
FIG. 9 is a flow chart of a lubricant oil supply control routine adopted in a second embodiment of the present invention.

Now, turning to FIG. 9, there is shown a second embodiment of the present invention. In the following description of the second embodiment, the component elements which are identical to those of the foregoing first embodiment will be simply designated by the same reference numerals to avoid repetitions of similar explanations.

This second embodiment has a feature in that the operation of the lubricant circulation pump 46 is turned on and off by way of an on-off control of the pump drive motor 47 in relation with the temperature T of lubricant oil G, vehicle speed V and output pressure P of the lubricant circulation pump 46.

Namely, in a lubricant oil supply control routine of FIG. 9, Steps 21 to 29 are executed to carry out the same processing as in Steps 1 to 9 in the first embodiment (FIG. 8). In next Step 30, an output pressure P of the lubricant circulation pump 46 is read in from a pressure sensor 52 (see FIGS. 4 and 7) to judge whether or not the output pressure P is higher than a predetermined reference pressure P1 in Step 31.

In this instance, the reference pressure P1 is a criterial value to be used in making a judgment as to whether or not the lubricant circulation pump 46 is put in a dry idling operation, that is, disabled to suck in lubricant oil G due to decrease of lubricant oil G.

In case the judgment in Step 31 is "NO", it means that the output pressure of P the lubricant circulation pump 46 is lower than the reference pressure P1, and presumably the lubricant circulation pump 46 is disabled to suck in lubricant oil G in the wheel mounting case 19 through the inlet opening 42A (see FIGS. 4 and 5) of the intake pipe 42. Therefore, in this case, the processing goes to Step 32 to turn off the pump drive motor 47 and suspend the operation of the lubricant circulation pump 46. Thereafter, the processing returns to Step 21 and onwards.

Thus, even if the vehicle speed V is judged to be lower than the reference speed V1 in Step 29, the pump drive motor 47 is instantly turned off to suspend the operation of the lubricant circulation pump 46 when the output pressure P of the lubricant circulation pump 46 drops below the reference pressure P1, thereby preventing dry idling operations of the lubricant circulation pump 46.

Further, in case the judgment in Step 31 is "YES", it means that the output pressure P of the lubricant circulation pump 46 is higher than the reference pressure P1, and presumably the lubricant circulation pump 46 is in operation in a normal state, that is, not in a dry state. In this case, the processing returns to continue execution of Step 26 and onwards again.

With the arrangements as described above, the second embodiment can produce substantially the same operational effects as the foregoing first embodiment, eliminating the problem of dry idling operations of the lubricant circulation pump 46. Particularly, the second embodiment, which is arranged to turn on and off the lubricant circulation pump 46 through an on-off control of the pump drive motor 47 in relation with vehicle speed V and output pressure P of the lubricant circulation pump 46, can produce additional operational effects as described below.

Namely, as mentioned in the first embodiment, the rotational speed of the wheel mounting case 19 which is put in rotation together with the rear wheel 7 is not so high as long as the vehicle speed V is lower than the reference speed V1, so that there is little possibility of the surface level of lubricant oil G in the wheel mounting case 19 being dropped below the inlet opening 42A of the intake pipe 42 under the influence of strong centrifugal force.

However, in case the reference speed V1 is set at a threshold value at which the lubricant circulation pump 46 could be put in a dry idling operation, the following situations may take place. Namely, in this case, even when the vehicle speed V is lower than the reference speed V1, lubricant oil G in the wheel mounting case 19 can behave in such a way as to stick on the entire inner peripheral surface of the wheel mounting case 19 as indicated by a two-dot chain line in FIG. 5 under the influence of viscosity of lubricant oil G (i.e., variations in viscosity caused by temperature elevations), causing the surface level of lubricant oil G to drop below the inlet opening 42A of the intake pipe 42.

In this regard, the second embodiment employs a control routine which is arranged to read in the output pressure P in Step 30 and then make a judgment in Step 31 as to whether or not the output pressure P is higher than the reference pressure P1. Therefore, even when the vehicle speed V is lower than a reference speed V1, dry idling operations of the lubricant circulation pump 46 can be prevented by checking out the output pressure P of the lubricant circulation pump 46. This contributes to enhance the reliability and safety of the vehicle all the more.

Figure 10:
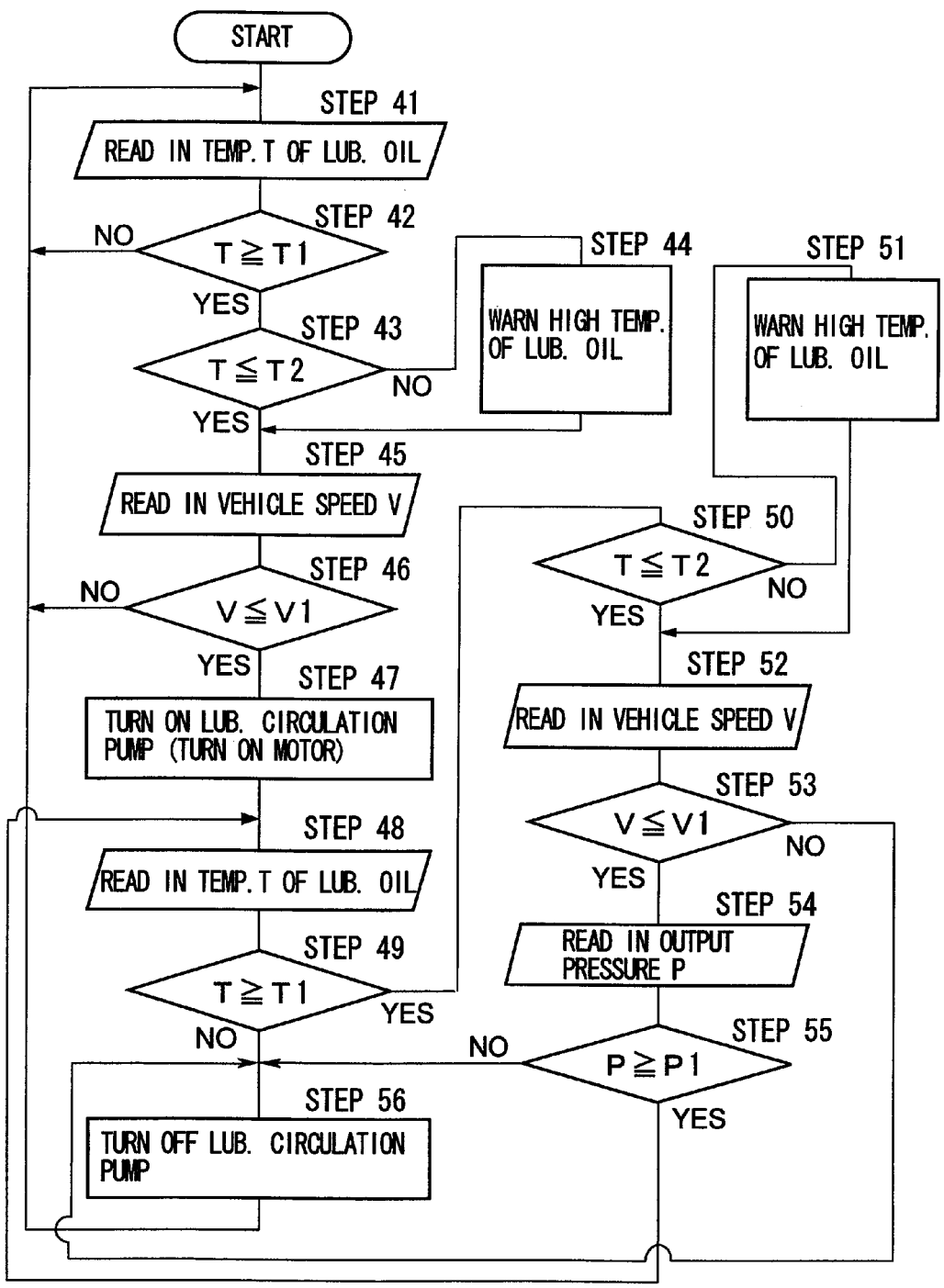
FIG. 10 is a flow chart of a lubricant oil supply control routine adopted in a third embodiment of the present invention.

Now, turning to FIG. 10, there is shown a third embodiment of the present invention. In the following description of the third embodiment, the component elements which are identical to those of the foregoing first embodiment will be simply designated by the same reference numerals to avoid repetitions of similar explanations.

In short, the third embodiment has features in that, by the use of an indicator 57 of FIG. 7, for example, a warning information is given to an operator in the cabin 5 when the temperature T of lubricant oil G has risen for example, in excess of a warning temperature T2 of 90° C. to 100° C. (T2>T1), warning the operator that the temperature T of lubricant oil G is at a high level.

In this instance, the warning temperature T2 means a temperature value (e.g., 90° C. to 100° C.) which is far higher than the afore-mentioned reference temperature T1 (e.g., 40° C. to 60° C.) in the first embodiment, i.e., for judging an abnormality in the lubricant oil circulation device 41.

Namely, in the case of the lubricant oil supply control routine of FIG. 10, Steps 41 and 42 are executed to carry out the same processing as in Steps 1 and 2 of the control routine in the first embodiment (see FIG. 8). Then, in next Step 43, a judgment is made as to whether or not the temperature T of lubricant oil G is lower than a warning temperature T2. As long as the judgment in Step 43 is "YES", Steps 45 to 49 are executed to carry out the same processing as in Steps 3 to 7 of the first embodiment (see FIG. 8).

However, in case the judgment in Step 43 is "NO", it means that the temperature T of lubricant oil G has risen above the warning temperature T2. Therefore, in next Step 44, a warning that the temperature T of lubricant oil G is at an abnormally high level is given to the operator by way of the indicator 57 of FIG. 7 to the effect that the vehicle speed should be lowered, and that the lubricant oil circulation device 41 is in need of a checkout or maintenance and service. Thereafter, the processing continues execution of Step 45 and onwards.

Further, even after turning on the lubricant circulation pump 46 in Step 47, a judgment is made in Step 50 as to whether or not the temperature T of lubricant oil G is lower than the warning temperature T2. As long as the judgment in Step 50 is "YES", Steps 52 to 56 are executed to carry out the same processing as in Steps 28 to 32 of the second embodiment (see FIG. 9).

On the other hand, in case the judgment in Step 50 is "NO", it means that the temperature T of lubricant oil G has risen above the warning temperature T2. Therefore, in this case, the processing goes to a next Step 51 to give a warning that the temperature T of lubricant oil G is at abnormally high level by way of the indicator 57 to the effect that the vehicle speed should be lowered, and that the lubricant oil circulation device 41 is in need of a checkout or maintenance and service. Thereafter, the processing continues execution of Step 52 and onwards.

Being arranged as described above, the third embodiment can produce substantially the same operational effects as in the foregoing first and second embodiments. Particularly in the case of the third embodiment, a warning is given to an operator of the vehicle as soon as the temperature T of lubricant oil G gets higher than a warning temperature T2, urging the operator to quickly cope with the problem if any.

Figure 11:
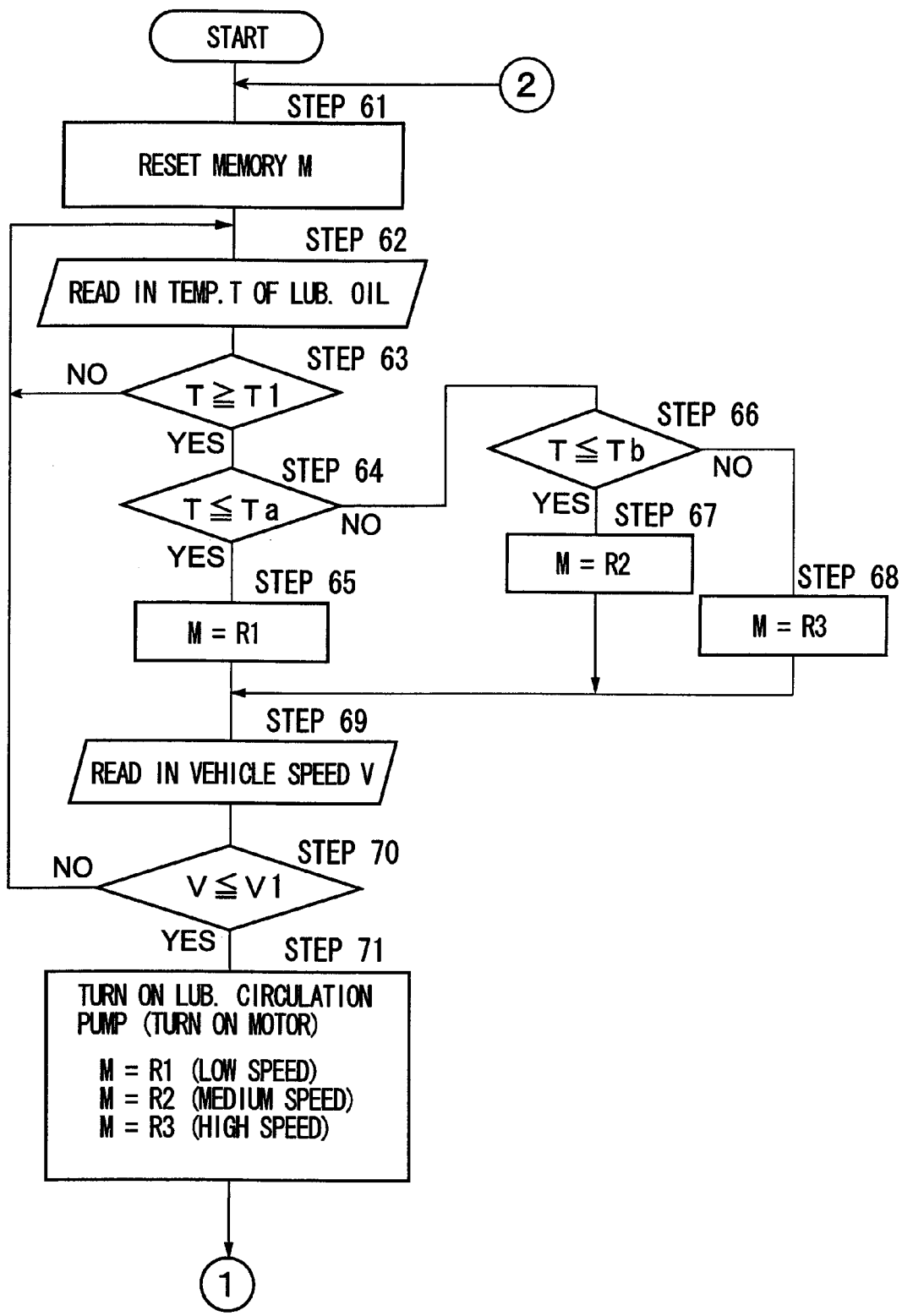
FIG. 11 is a flow chart of a lubricant oil supply control routine adopted in a fourth embodiment of the present invention.
Figure 12:
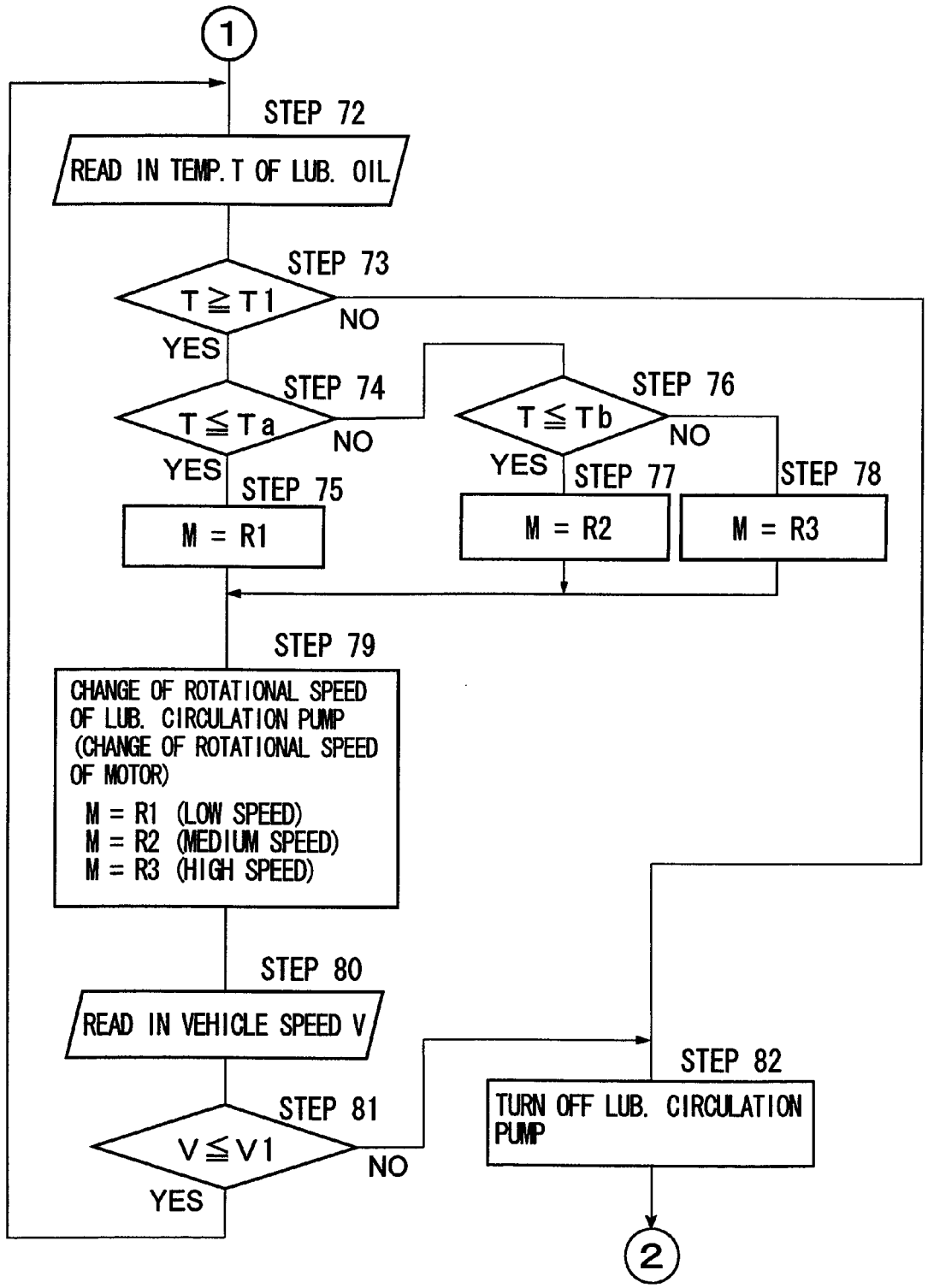
FIG. 12 is a flow chart of a lubricant oil supply control routine following the flow chart of FIG. 11.
Figure 13:
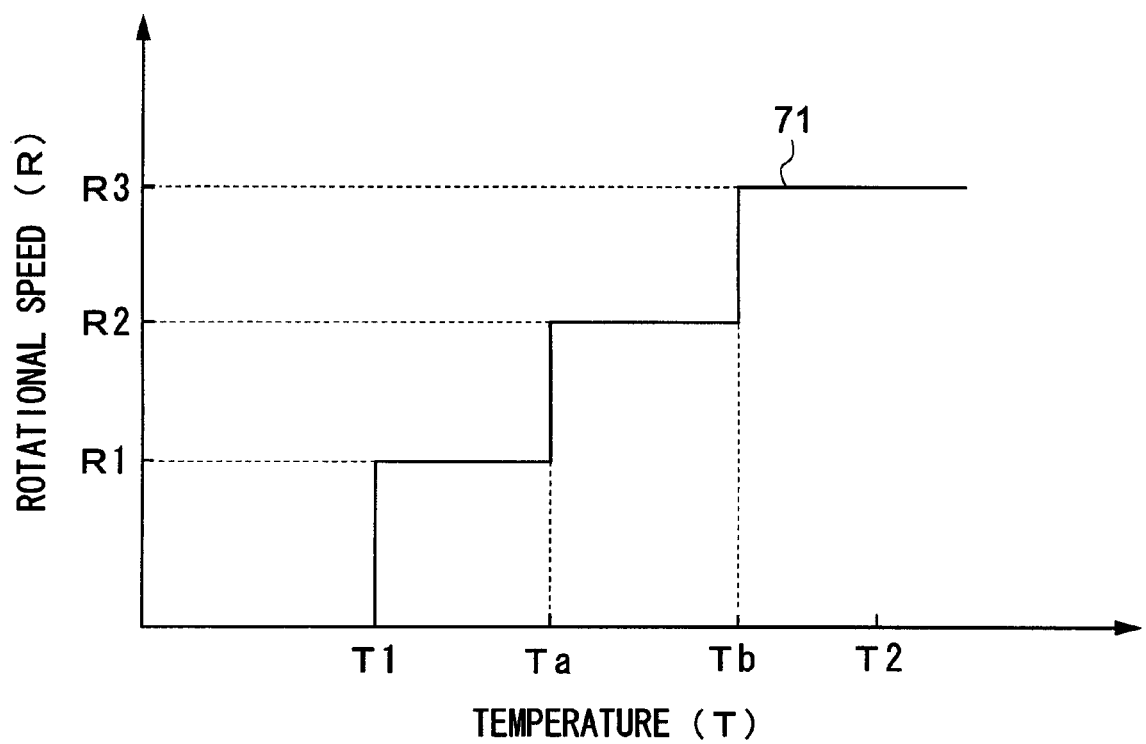
FIG. 13 is a characteristics curve diagram showing the relation between the temperature of lubricant oil and the rotational speed of an electric motor in a fourth embodiment of the present invention.

Now, turning to FIGS. 11 through 13, there is shown a fourth embodiment of the present invention. In the following description of the fourth embodiment, the component elements which are identical to those of the foregoing first embodiment will be simply designated by the same reference numerals to avoid repetitions of similar explanations.

In short, the fourth embodiment has a feature in that the rotational speed R of the lubricant circulation pump 46, which is rotationally driven by the pump drive motor 47, is controlled variably according to the temperature T of lubricant oil G.

Namely, as shown in FIG. 13, the fourth embodiment is arranged to control the rotational speed R of the lubricant circulation pump 46 to R1, R2, R3 (R1<R2<R3) when the temperature T of lubricant oil G becomes higher than the reference temperature T1, which is used in judging as to whether or not the lubricant circulation pump 46 needs to be turned on, and the temperatures Ta and Tb which are higher than the temperature T1 (T1<Ta<Tb).

Namely, in the lubricant oil supply control routine of FIG. 11, at the start of the processing, a memory M provided in a memory section 56A of a vehicle controller 56 is reset (initialized) in Step 61, and Steps 62 and 63 are executed to carry out the same processing as in Steps 1 and 2 of the first embodiment (see FIG. 8).

However, in next Step 64, a judgment is made as to whether or not the temperature T of lubricant oil G is lower than the temperature Ta (see FIG. 13). If the judgment in Step 64 is "YES", the processing goes to Step 65 to set up a low speed R1 in the memory M as "M=R1".

In case the judgment in Step 64 is "NO", the processing goes to Step 66 to make a judgment as to whether or not the temperature T of lubricant oil G is lower than the temperature Tb (T1<Ta<Tb<T2). In this case, the temperature T2 stands for a warning temperature that the temperature T of lubricant oil G is at a level which is regarded too high.

Further, in case the judgment in Step 66 is "YES", a medium speed R2 of the lubricant circulation pump 46 is set up in the memory M as "M=R2" in Step 67. In case the judgment in Step 66 is "NO", a high speed R3 of the lubricant circulation pump 46 is set up in the memory M as "M=R3" in Step 68. Thereafter, Steps 69 and 70 are executed to carry out the same processing as in Steps 3 and 4 in the first embodiment (see FIG. 8).

Then, in Step 71, the pump drive motor 47 is started to drive the lubricant circulation pump 46. In this case, according to the characteristics curve 71 in FIG. 13, the rotational speed of the lubricant circulation pump 46 is set, for example, at a low speed when the setting of the memory M is "M=R1". When the setting of the memory is "M=R2", the rotational speed of the lubricant circulation pump 46 is set at a medium speed. Further, if the setting of the memory M is "M=R3", the rotational speed of the lubricant circulation pump 46 is set at a high speed.

In this manner, while rotationally driving the lubricant circulation pump 46 variably at the low speed R1, medium speed R2 or high speed R3, the processing goes to Step 72 of FIG. 12, and Steps 72 to 78 are executed to carry out the same processing as in above-described Steps 62 to 68. In next Step 79, in case the memory M is updated before or after turning on the lubricant circulation pump 46, the rotational speed of the lubricant circulation pump 46 is set at low speed R1, medium speed R2 or high speed R3 according to the updated contents of the memory M (i.e., R1, R2 or R3).

It should be noted that the memory M is not updated in case there is almost no change in temperature T of lubricant oil G before or after turning on the lubricant circulation pump 46, so that the lubricant circulation pump 46 is driven at the same speed without changing its rotational speed in the course of processing between Steps 71 and 79.

Then, Steps 80 to 82 are executed to carry out the same processing as in Steps 8 to 10 described in the first embodiment (see FIG. 8), followed by re-execution of Step 61 of FIG. 11 and onwards.

Being arranged as described above, the fourth embodiment of the present invention can produce substantially the same operational effects as in the foregoing first embodiment, eliminating the problem of dry idling operations of the lubricant circulation pump 46. Besides, in the fourth embodiment, the rotational speed of the lubricant circulation pump 46 is variably controlled in relation with the temperature T of lubricant oil G to produce additional operational effects as described below.

Namely, when the rotational speed R of the lubricant circulation pump 46 is set at the low speed R1, lubricant oil G is circulated relatively slowly through an oil cooler 49, which is exemplified in FIG. 4, to cool down lubricant oil G slowly and to supply cooled lubricant oil G toward the supply pipe 45 at a small flow rate.

Further, when the rotational speed R of the lubricant circulation pump 46 is set at the medium speed R2, lubricant oil G is circulated at a medium speed through the oil cooler 49 to lower the temperature T of lubricant oil G more quickly than when the lubricant circulation pump 46 is in low speed rotation, and to supply cooled lubricant oil G toward the supply pipe 45 at a medium flow rate.

Furthermore, when the rotational speed R of the lubricant circulation pump 46 is set at the high speed R3, lubricant oil G is circulated at a high speed through the oil cooler 49 to quickly lower the temperature T of lubricant oil G and to supply cooled lubricant oil G toward the supply pipe 45 at a large flow rate.

Figure 14:
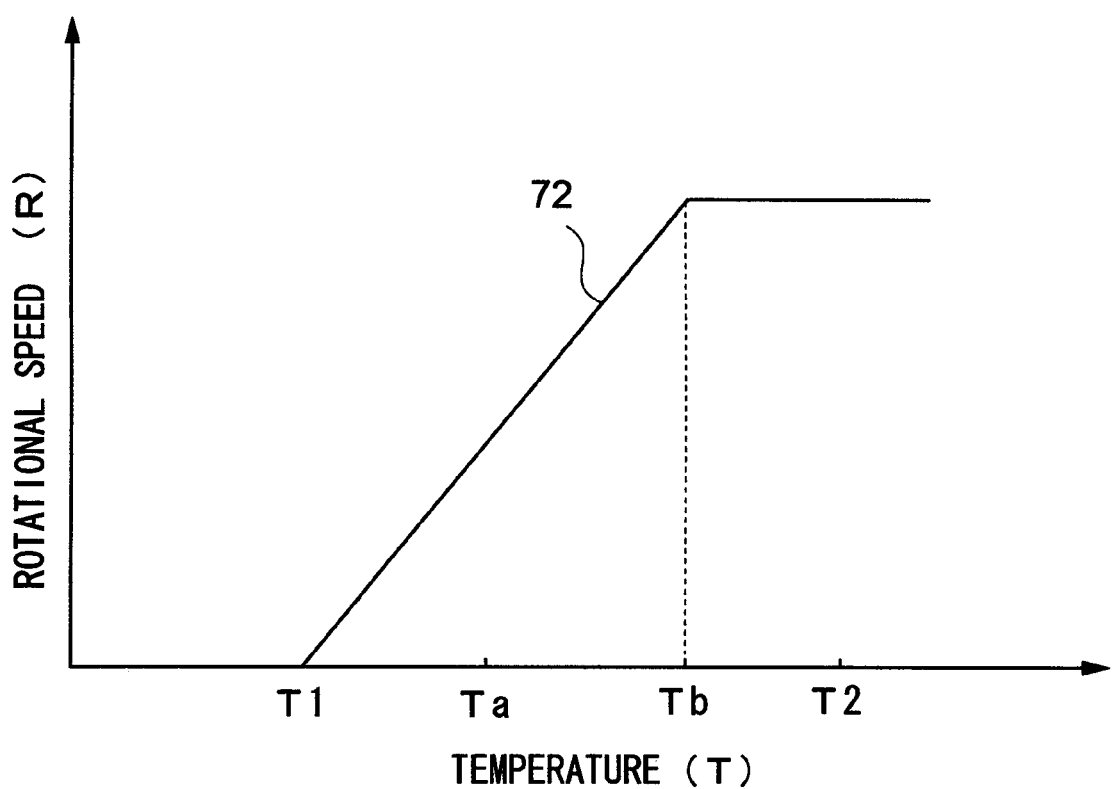
FIG. 14 is a characteristics curve diagram showing the relation between the temperature of lubricant oil and the rotational speed of the electric motor in a modification of the fourth embodiment.

In the above-described fourth embodiment, by way of example the rotational speed of the lubricant circulation pump 46 is controlled to a low speed, medium speed or high speed. However, needless to say, the present invention is not limited to the particular example shown. For instance, as in a modification shown in FIG. 14, the rotational speed of the lubricant circulation pump 46 may be varied continuously along the characteristics curve 72 as long as the temperature T of lubricant oil G is in the range between T1 and Tb. Alternatively, of course the rotational speed of the lubricant circulation pump 46 may be controlled stepwise, for example, in two steps or in four steps or more.

Figure 15:
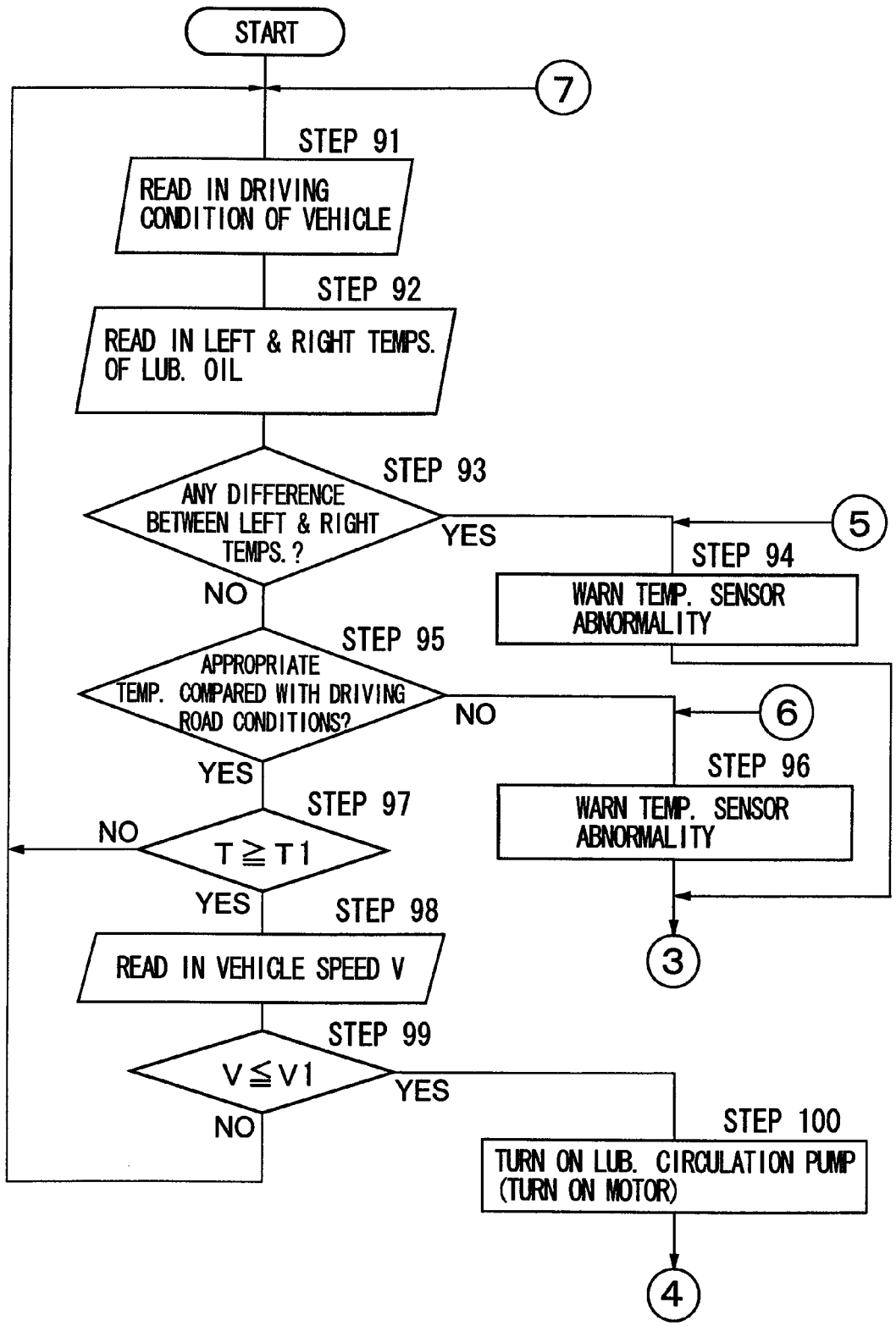
FIG. 15 is a flow chart of a lubricant oil supply control routine adopted in a fifth embodiment of the present invention.
Figure 16:
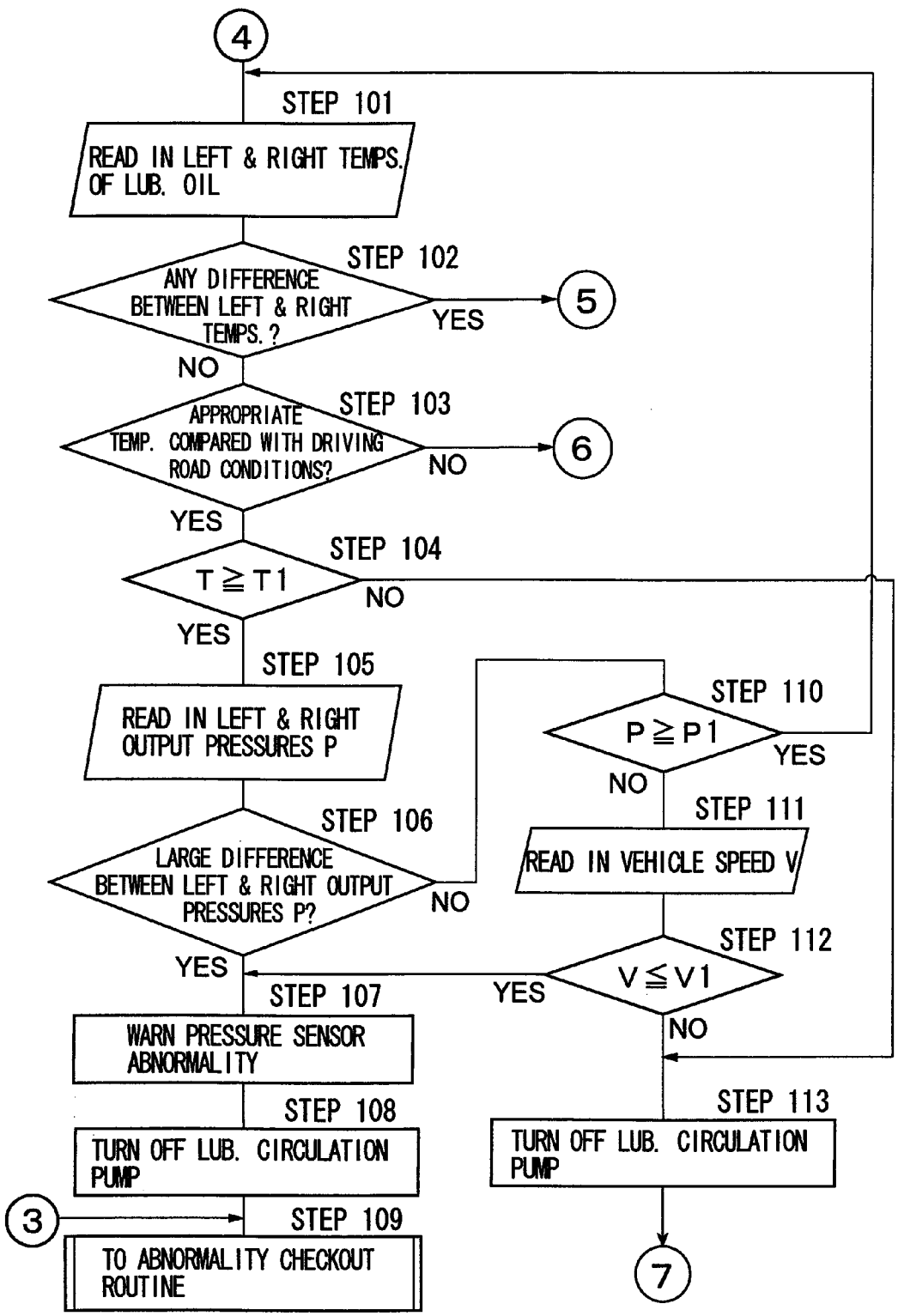
FIG. 16 is a flow chart of a lubricant oil supply control routine following the flow chart of FIG. 15.

Now, turning to FIGS. 15 and 16, there is shown a fifth embodiment of the present invention. In the following description of the fifth embodiment, the component elements which are identical to those of the foregoing first embodiment will be simply designated by the same reference numerals to avoid repetitions of similar explanations.

In short, the present embodiment has a feature in that it is adapted to control lubricant oil G in both of wheel mounting cases 19 provided at the left and right sides of the axle housing 12 (see FIG. 6).

Namely, in the fifth embodiment, as exemplified in FIG. 6, the lubricant oil circulation device 41 has left and right circulation paths 41A and 41B independently of each other for left and right wheel mounting cases 19, to control the supply of lubricant oil G to the left and right wheel mounting cases 19 independently by way of the left and right circulation paths 41A and 41B, respectively.

More specifically, the supply of lubricant oil is controlled in the manner as follows. In the first place, in Step 91 of FIG. 15, driving conditions of a vehicle (e.g., load conditions of a vehicle in travel and running time duration after an engine start) are read in at the start of a lubricant oil supply control routine. Further, in Step 92, temperatures T of lubricant oil G in the left and right wheel mounting cases 19 (FIG. 6) are read in from left and right temperature sensors 53, respectively.

Then, in next Step 93, a judgment is made as to whether or not there is a clear difference between the temperatures T of lubricant oil G detected by the left and right temperature sensors 53. In this case, if the judgment in Step 93 is "YES", it means that, for example, one of the left and right temperature sensors is abnormal (out of order), or there is a large difference in surface level of lubricant oil G between the left and right wheel mounting cases 19. Therefore, in this case, the processing goes to Step 94 to warn by way of an indicator 57 an abnormality in a temperature sensor 53 or an abnormality of a lubricant oil surface level. The processing then goes to Step 109 of FIG. 16 to start an abnormality checkout routine, as described below.

In case the judgment in Step 93 is "NO", the processing goes to Step 95 to make a judgment as to whether or not the temperatures T of lubricant oil G detected by the left and right temperature sensors 53 are at appropriate levels as compared with driving load conditions of the vehicle. If the judgment in Step 95 is "NO", it means the temperature T of lubricant oil G is either extremely high or extremely low compared with the driving load conditions. Therefore, in this case, the processing goes to Step 96 to warn by way of the indicator 57 an abnormality in a temperature sensor 53 or abnormality of a surface level of lubricant oil G (due to deficiency or excessiveness of lubricant oil G). Then, the processing goes to Step 109 to process an abnormality checkout routine in FIG. 16, which will be described hereinafter.

On the other hand, in case the judgment in Step 95 is "YES", it means that the temperature T of lubricant oil G is at an appropriate level as compared with the driving load conditions, and it is assumed that no abnormality has occurred to sensors. Therefore, in this case, Steps 97 to 100 are executed to carry out the same processing as in Steps 2 to 5 in the first embodiment (see FIG. 8).

Then, after turning on the lubricant circulation pump 46 in Step 100, Steps 101 to 104 of FIG. 16 are executed to carry out the same processing as in above-described Steps 92 to 97. Namely, in case the judgment in Step 102 is "YES", the processing returns to Step 94 of FIG. 15 to warn an abnormality in a temperature sensor 53. Further, in case the judgment in Step 103 is "NO", the processing returns to Step 96 of FIG. 15 to warn an abnormality in a temperature sensor 53. Furthermore, in case the judgment in Step. 104 is "NO", it means that the temperature of lubricant oil G is at a low level, so that the processing goes to Step 113, which will be described hereinafter, to turn off the lubricant circulation pump 46.

On the other hand, incase the judgment in Step 104 is "YES", the processing goes to next Step 105 to read in output pressures P of the respective lubricant circulation pumps 46 from the left and right pressure sensors 52 exemplified in FIG. 6. Then, in Step 106, a judgment is made as to whether or not there is a large difference in output pressure P between the left and right lubricant circulation pumps 46. If the judgment in Step 106 is "YES", it means that there is a large difference in output pressure P between the left and right lubricant circulation pumps 46, the processing goes to Step 107 to warn an operator of an abnormality in a pressure sensor 52 by way of the indicator 57, turning off the lubricant circulation pump 46 in Step 108, which will be described hereinafter.

Further, in case the judgment in Step 106 is "YES", it means that the surface level of lubricant oil G has dropped in one of the left and right wheel mounting cases 19 shown in FIG. 6, presumably due to deficiency of lubricant oil G. Otherwise, a trouble may have occurred to one of the lubricant circulation pumps 46.

Therefore, in next Step 107, by way of the indicator 57, an operator is warned to check out a trouble in one of left and right lubricant circulation pumps 46 or pressure sensors 52 or deficiency of lubricant oil G. In next Step 108, the pump drive motor 47 is turned off to suspend forced lubricant circulation by the lubricant circulation pumps 46. Thereafter, the processing goes to Step 109 to execute a control routine under abnormal conditions, in the manner as described below.

Namely, the control routine under abnormal conditions, starting from Step 109, limits the vehicle speed of a dump truck 1 (a vehicle), and carries out a routine for limiting the engine horse power as well as a routine for reducing the load of the engine 8 as much as possible, allowing the dump truck 1 to keep traveling under as small a load as possible at a working site like a mine.

In case the judgment in Step 106 is "NO", it means that there is little difference in output pressure P between the left and right lubricant circulation pumps 46 exemplified in FIG. 6, so that the pressure sensors 52 are presumed to be in operation in a normal state. Therefore, in this case, the processing goes to next Step 110 to make a judgment as to whether or not the output pressure P is higher than a reference pressure P1 (see Step 31 of FIG. 9).

In case the judgment in Step 110 is "YES", it means that the output pressure P of the lubricant circulation pump 46 is higher than the reference pressure P1 and the lubricant circulation pump 46 is presumed to be in operation in a normal state, taking the lubricant oil G in the wheel mounting case 19 through the inlet opening 42A of the intake pipe 42 (see FIGS. 4 and 5). Therefore, in this case, the processing returns to execute Step 101 and onwards again. On the other hand, in case the judgment in Step 110 is "NO", it means that the output pressure P of the lubricant circulation pump 46 is lower than the reference pressure P1, and the lubricant circulation pump 46 is presumed to be in operation in an abnormal state, failing to suck in lubricant oil G in the wheel mounting case 19 through the inlet opening 42A of the intake pipe 42 (see FIGS. 4 and 5). Thus, in this case, the processing goes to Step 111 to read in the vehicle speed V, making a judgment in next Step 112 as to whether or not the vehicle speed V is lower than a reference speed V1.

In case the judgment in Step 112 is "NO", it is presumed that the surface level of the lubricant oil G has dropped below the inlet opening 42A of the intake pipe 42 under the influence of centrifugal force, in the same way as the processing in Steps 9 and 10 in the first embodiment (see FIG. 8). Accordingly, in this case, the processing goes to next Step 113 to turn off the pump drive motor 47, suspending the operation of the lubricant circulation pump 46. Thereafter, the processing returns to Step 91 of FIG. 15 to execute Step 91 and onwards.

However, in case the judgment in Step 112 is "YES", it means that the output pressure P of the lubricant circulation pump 46 is lower than the reference pressure P1 although the vehicle speed V is lower than the reference speed V1. Thus, in this case, it is presumed that a trouble has occurred to either the pressure sensor 52 or lubricant circulation pump 46.

Therefore, in this case, the processing goes to Step 107 to give a warning to an operator by way of the indicator 57 to check out the deficiency of lubricant oil G in a wheel mounting case 19 or a trouble in a lubricant circulation pump 46 or in a pressure sensor 52. Thereafter, the lubricant circulation pump 46 is turned off in Step 108, and the processing goes to Step 109 to execute a control routine under abnormal conditions.

Being arranged as described above, the present embodiment of the present invention can produce substantially the same operational effects as the foregoing first embodiment, eliminating the problem of dry idling operations of the lubricant circulation pump 46. Particularly, the present embodiment is arranged to control lubricant oil G of the left and right wheel mounting cases 19 provided at both left and right sides of the axle housing 12 to produce the operational effects as follows.

Namely, in case a clear difference in the temperature T of lubricant oil G is detected between the wheel mounting cases 19 provided at both left and right sides of the axle housing 12 (see FIG. 6) immediately after starting a vehicle (Steps 93 and 94), there is a possibility of a trouble occurring to the left and right temperature sensors 53 or of an abnormality in wiring, and a warning to this effect is given to an operator in the cabin 5 by way of the indicator 57.

Further, in case there is no change in the detected value (the temperature T) from a temperature sensor 53 even with a time lapse of 10 to 30 minutes after starting the wheel drive motor 17, this is clearly an abnormality (a trouble) in the temperature sensor 53 and a warning to this effect is given to an operator. On the other hand, even in case the detected value (the temperature T) from temperature sensors 53 changes with time but there is still a clear difference in the detected value between the left and right temperature sensors 53, it is presumed that left and right wheel mounting cases 19 are charged with a deficient amount or an excessive amount (more than a specified amount) of lubricant oil G, and a warning to this effect is given to an operator in the cabin 5 by way of the indicator 57.

Further, a hydraulic circuit for a brake (not shown) is incorporated in the traveling drive unit 11 shown in FIGS. 3 and 4. Therefore, in the event of a fracture or damage of a seal in a brake system, there is a possibility of a brake fluid getting into and mixing into lubricant oil G in the wheel mounting case 19, raising the surface level of lubricant oil G to an abnormally high level. However, even in such a case, an operator can be warned of a possibility of leakage or mixing of a brake fluid early on by comparing left and right lubricant oil G.

It should be noted that Steps 93 and 94 of FIG. 15 and Step 102 of FIG. 16 in the fifth embodiment indicate a particular example of sensor checkout means for judging an abnormality in temperature sensors 53, which is the feature of claim 6 of the present invention.

Figure 17:
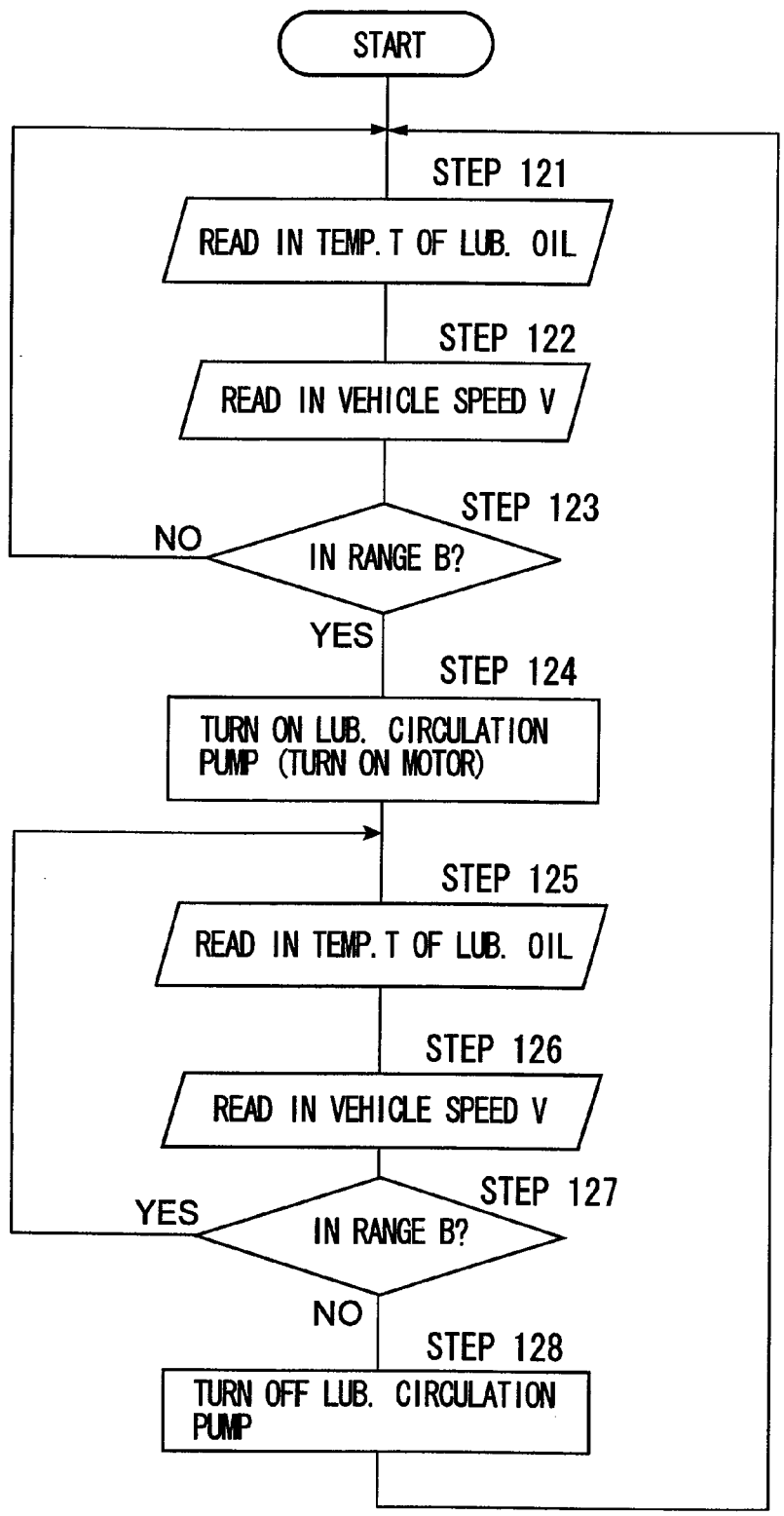
FIG. 17 is a flow chart of a lubricant oil supply control routine adopted in a sixth embodiment of the present invention.
Figure 18:
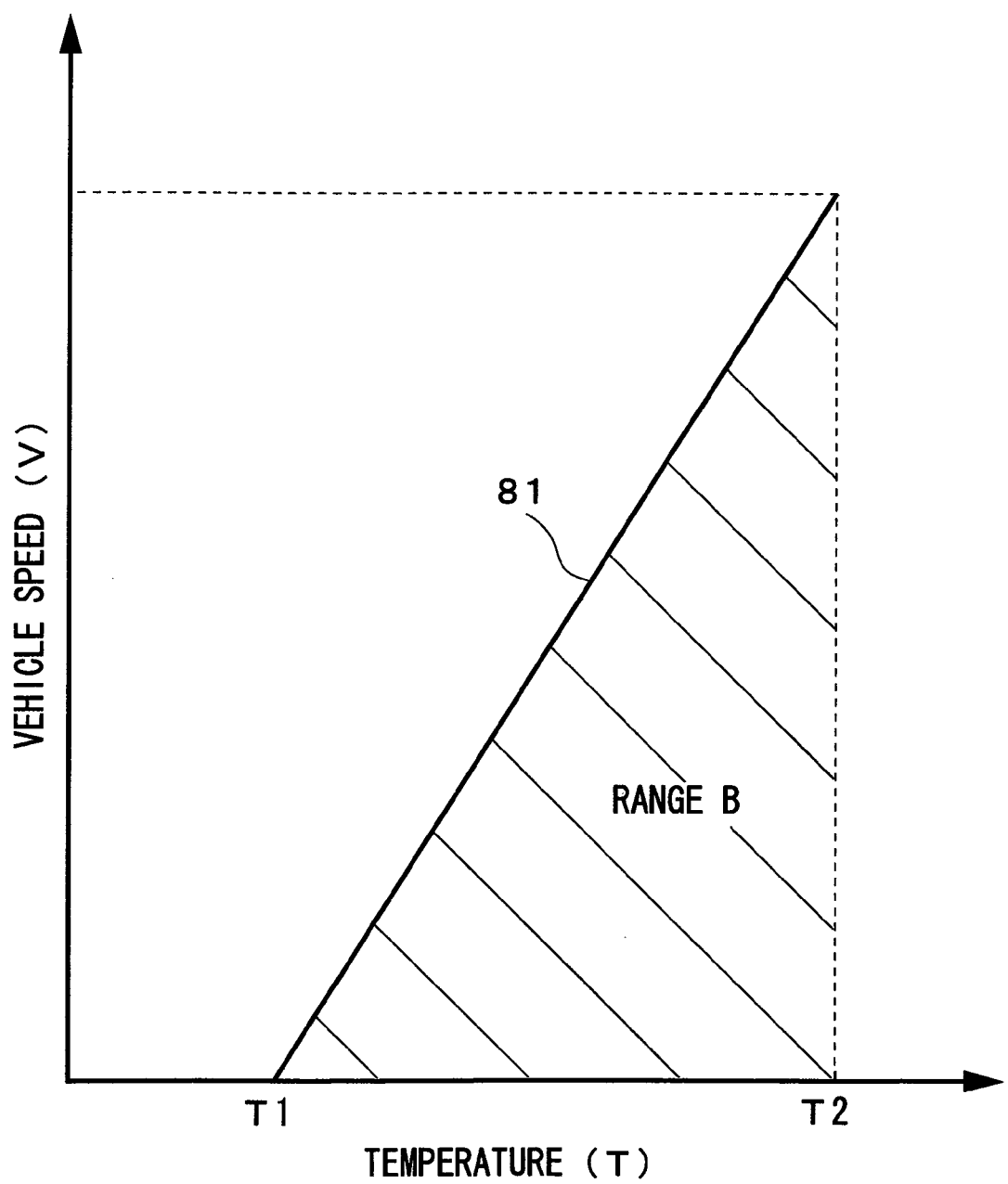
FIG. 18 is a characteristics curve diagram showing the relation between the temperature of lubricant oil and vehicle speed in the sixth embodiment.

Now, turning to FIGS. 17 and 18, there is shown a sixth embodiment of the present invention. In the following description of the sixth embodiment, the component elements which are identical to those of the foregoing first embodiment will be simply designated by the same reference numerals to avoid repetitions of similar explanations.

In short, the sixth embodiment has a feature in that the lubricant circulation pump 46 is controlled on and off according to temperature-vehicle speed characteristics diagram of FIG. 18.

Namely, in the case of the sixth embodiment, upon starting the lubricant oil supply control routine of FIG. 17, firstly the temperature T of lubricant oil G is read in from the temperature sensor 53 in Step 121, and then the vehicle speed V is read in from the speed sensor 55 in Step 122. In a next Step 123, a judgment is made as to whether or not the temperature T and vehicle speed V fall in a range B for turning on the pump drive motor 47 which is determined by a characteristics curve 81 in the diagram of FIG. 18 (hereinafter a range B for turning on the pump drive motor 47 will be referred to simply as "range B" for brevity).

In this instance, the characteristics curve 81 of FIG. 18 is obtained on the basis of experimental data from driving tests, and used, for example, in judging whether the temperature T from the temperature sensor 53 is lower than a reference temperature T1 (e.g., T1=40° C. to 60° C.), namely, at a low level where there is no need for cooling lubricant oil G irrespective of the vehicle speed V, that is, outside the range B determined by the characteristics curve 81.

Further, the viscosity (viscous resistance) of lubricant oil G drops gradually as temperature rises. On the other hand, the lower the temperature, the greater becomes the amount of lubricant oil G sticking due to the viscosity on inner peripheral surfaces of the wheel mounting case 19. Therefore, even in a low speed operation, the surface level of lubricant oil G can be dropped below the inlet opening 42A of the intake pipe 42 at low temperatures. On the other hand, the higher the vehicle speed V (i.e., the rotational speed of the wheel mounting case 19 which is rotated together with the rear wheel 7), the greater becomes the centrifugal force acting on lubricant oil G. Accordingly, as the vehicle speed V becomes higher, lubricant oil G in the wheel mounting case 19 behaves in such a way as to stick on the entire inner peripheral surfaces of the wheel mounting case 19 as exemplified by a two-dot chain line in FIG. 5, causing the surface level of lubricant oil G to drop below the inlet opening 42A of the intake pipe 42.

For this reason, the characteristics curve 81 extends obliquely, gradually narrowing the range B toward a higher vehicle speed V when the temperature T of lubricant oil G is between a reference temperature T1 and a warning temperature T2. It should be noted that the characteristics curve 81 is not necessarily a straight line and can be a curve. Further, in case the temperature T of lubricant oil G exceeds the warning temperature T2, it is desirable to warn an operator that the vehicle should be stopped.

In case the judgment in Step 123 is "YES", it means that the detected value of temperature T and vehicle speed V are in the range B of FIG. 18. That is, there is a necessity for cooling down lubricant oil G, and it is presumed that, upon turning on the pump drive motor 47, lubricant oil G in the wheel mounting case 19 can be sucked into the lubricant circulation pump 46 through the inlet opening 42A of the intake pipe 42.

Therefore, in case the judgment in Step 123 is "YES", the processing goes to Step 124 to start the pump drive motor 47, thereby rotationally driving the lubricant circulation pump 46 for circulation of lubricant oil G. Then, in next Step 125, the temperature T of lubricant oil G is read in from the temperature sensor 53 again, and also the vehicle speed V is read in from the speed sensor 55 in Step 126.

Then, in next Step 127 after turning on the lubricant circulation pump 46, a judgment is made as to whether or not the temperature T and vehicle speed V are in the range B of FIG. 18. As long as the judgment in Step 127 is "YES", lubricant oil G is kept in the forced circulation, and the processing repeats execution of Step 125 and onwards.

On the other hand, the judgment in Step 127 is "NO", it means that the temperature T and vehicle speed V are outside the range B of FIG. 18. Thus, in this case, it is presumed that the temperature T of lubricant oil G is lower than the reference temperature T1, or the surface level of lubricant oil G in the wheel mounting case 19 has dropped below the inlet opening 42A of the intake pipe 42 under the influence of centrifugal force resulting from high speed rotation.

Therefore, in this case, the processing goes to Step 128 to turn off the pump drive motor 47, suspending the operation of the lubricant circulation pump 46. Thereafter, the processing returns to Step 121 to execute Step 121 and onwards again. Thus, the lubricant circulation pump 46 is prevented from being put in a dry idling operation when the inlet opening 42A of the intake pipe 42 disposed in the wheel mounting case 19 comes out of lubricant oil G as a result of acceleration of the vehicle speed V.

Being arranged as described above, the sixth embodiment of the present invention can produce substantially the same operational effects as in the foregoing first embodiment, eliminating the problem of dry idling operations of the lubricant circulation pump 46 and the problem of premature abrasive wear and damages of seals and bearings of the lubricant circulation pump 46.

Figure 19:
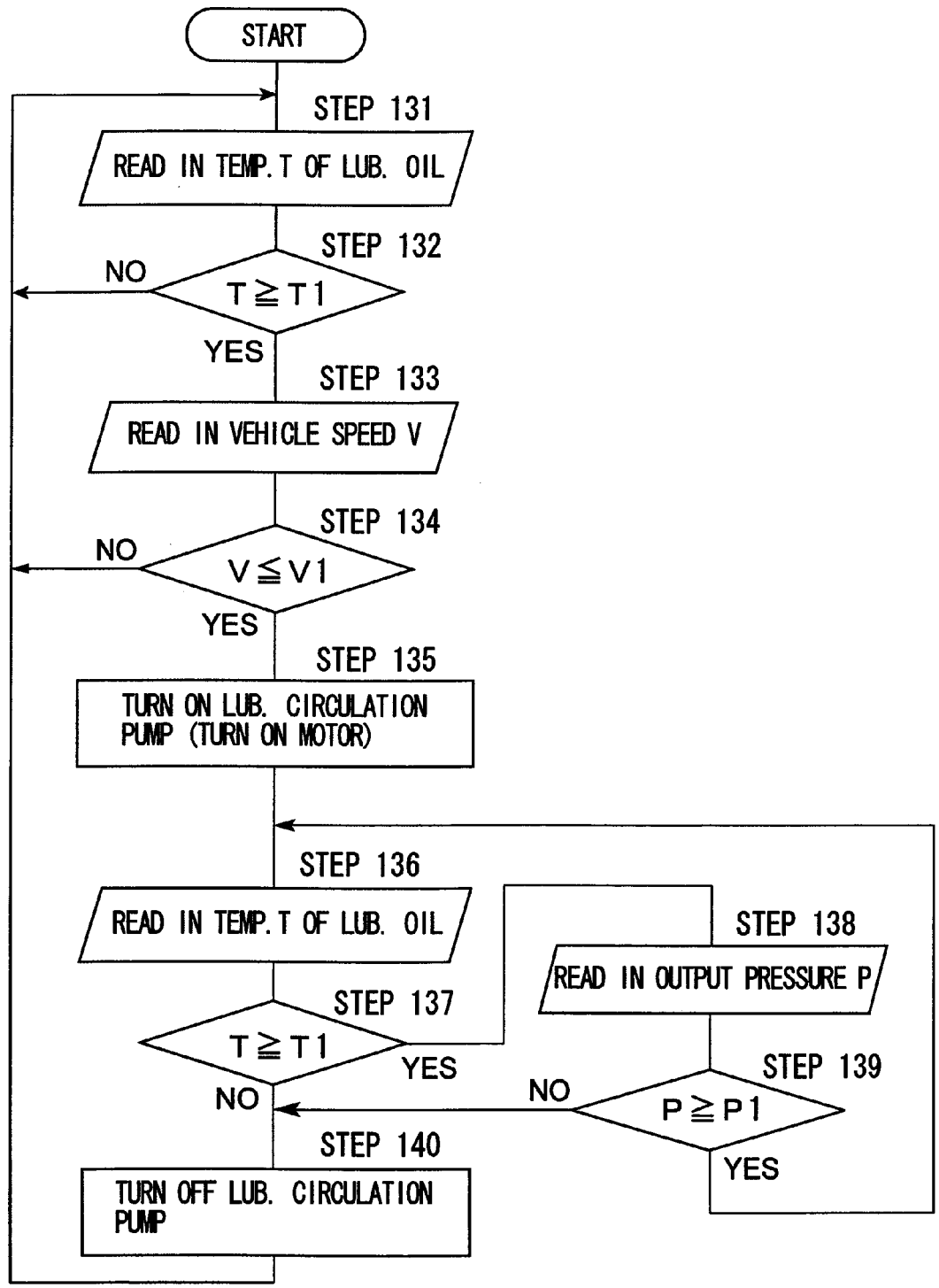
FIG. 19 is a flow chart of a lubricant oil supply control routine adopted in a seventh embodiment of the present invention.

Now, turning to FIG. 19, there is shown a seventh embodiment of the present invention. In the following description of the seventh embodiment, the component elements which are identical to those of the foregoing first embodiment will be simply designated by the same reference numerals to avoid repetitions of similar explanations.

In short, the present embodiment has a feature in that the lubricant circulation pump 46 by the pump drive motor 47 is controlled on and off according to the temperature T of lubricant oil, vehicle speed V and output pressure P of the lubricant circulation pump 46.

Namely, different from the first embodiment which is arranged to control the lubricant circulation pump 46 on the basis of vehicle speed V in Steps 8 and 9, the seventh embodiment is adapted to control the lubricant circulation pump 46 on the basis of output pressure P in Steps 138 and 139, which will be described hereinafter.

Namely, in a lubricant oil supply control routine of FIG. 19, Steps 131 to 137 are executed to carry out the same processing as in Steps 1 to 7 of the first embodiment (see FIG. 8). In next Step 138, the output pressure P of the lubricant circulation pump 46 is read in from a pressure sensor 52 (see FIG. 7), and then a judgment is made in Step 139 as to whether or not the output pressure P is higher than a predetermined reference pressure P1.

In case the judgment in Step 139 is "NO", it means that the output pressure P of the lubricant circulation pump 46 is lower than the reference pressure P1, and it is presumed that lubricant oil G in the wheel mounting case 19 is not sucked into the lubricant circulation pump 46 through the inlet opening 42A of the intake pipe 42 (see FIGS. 4 and 5). Therefore, in this case, the processing goes to Step 140 to turn off the pump drive motor 47, suspending the operation of the lubricant circulation pump 46. Then, the processing returns to Step 131 to continue processing onwards.

Further, in case the judgment in Step 139 is "YES", it means that the forced circulation of lubricant oil G by the lubricant circulation pump 46 is in effect in favorable conditions, so that the processing returns to Step 136 to continue processing onwards.

Being arranged as described above, the seventh embodiment of the present invention can produce substantially the same operational effects as in the foregoing first embodiment, eliminating the problem of dry idling operations of the lubricant circulation pump 46.

In the above-described first embodiment, byway of example the reduction gear mechanism is constituted by a two-stage planetary gear reduction mechanism consisting of a planetary gear reduction mechanism 23 of a first stage and a planetary gear reduction gear mechanism 31 of a second stage. However, needless to say, the present invention is not limited to this particular example. For instance, there may be employed a reduction gear mechanism of a single stage or of more than three stages.

Further, in the first embodiment, byway of example a speed sensor 55 is provided on a wheel drive motor 17 to detect the rotational speed of a rear wheel 7 by way of the rotational speed of the rotational shaft 18. However, the present invention is not limited to this particular example. For instance, arrangements may be made to directly detect the rotational speed of the rear wheel 7 or to detect the rotational speed of the wheel mounting case 19. Namely, the speed sensor to be employed in the present invention suffices as long as it can detect the rotational speed of a wheel (rear wheel) either directly or indirectly.

Further, in the foregoing embodiments, by way of example, as a drive source, an electric motor is employed for the wheel drive motor 17. However, the present invention is not limited to this particular example. For instance, a hydraulic motor or the like may be employed as a drive source of a traveling drive unit, if desired.

Further, in the foregoing embodiments, by way of example a warning of an abnormality in a sensor is given by the use of the indicator 57 exemplified in FIG. 7. However, the present invention is not limited to this particular example. For instance, arrangements may be made to give a warning or alerting message to an operator by the use of a voice synthesizer, warning buzzer or lamp.

Further, in the foregoing embodiments, a rear wheel drive dump truck 1 is taken as a typical example of working vehicles. However, the present invention can be similarly applied to a front wheel drive or four wheel drive dump truck or to other working vehicles with a drive wheel or wheels.

The invention claimed is:

1. A traveling drive unit for a working vehicle, having a tubular wheel mounting case to be put in rotation integrally with a wheel for the working vehicle, a reduction gear mechanism provided in said wheel mounting case and adapted to reduce rotational speed in transmitting rotation of a drive source to said wheel mounting case, and a lubricant oil circulation means for supplying lubricant oil to said reduction gear mechanism, characterized in that;

said lubricant oil circulation means is comprised of an electric motor, a lubricant circulation pump which is rotationally driven by said electric motor to forcibly circulate lubricant oil pooled in said wheel mounting case, and a motor control means adapted to turn on and turn off said electric motor according to detected temperature by a temperature sensor for detecting temperature of said lubricant oil and detected speed by a speed sensor for detecting rotational speed of said wheel;

said motor control means is adapted to turn on said electric motor when a temperature of lubricant oil detected by said temperature sensor is higher than a predetermined reference temperature and a speed of said wheel detected by said speed sensor is lower than a predetermined reference speed; and said motor control means is adapted to turn off said electric motor when said detected temperature is lower than said reference temperature or said detected speed is higher than said reference speed.

2. The traveling drive unit for working vehicle according to claim 1, wherein a tubular axle housing extending in the left and right direction is mounted on lower side of a vehicle body constituting said working vehicle, a pair of wheel mounting cases being rotatably provide on an outer peripheral side at both left and right ends of said axle housing respectively, while said lubricant oil being pooled at the bottom of each wheel mounting case;

said lubricant oil circulation means includes an intake pipe for sucking lubricant oil in each of said wheel mounting cases by said lubricant circulation pump, and a supply pipe for supplying and circulating lubricant oil sucked by said lubricant circulation pump to said wheel mounting case; and each of said intake pipes is extended internally of said axle housing and led into said wheel mounting case, its inlet opening being opened in lubricant oil pooled at the bottom of said wheel mounting case.

3. The traveling drive unit for working vehicle according to claim 1, wherein said motor control means is adapted to control rotational speed of said electric motor variably according to temperatures of lubricant oil detected by said temperature sensor.

4. The traveling drive unit for working vehicle according to claim 1, wherein a tubular axle housing extending in the left and right direction is mounted on lower side of a vehicle body constituting said working vehicle, a pair of wheel mounting cases are rotatably provided at both left and right ends of said axle housing respectively, respective temperature sensors are provided at both left and right ends of said axle housing, and a sensor checkout means is adapted to judge a temperature sensor abnormality on the basis of a difference between temperatures of lubricant oil detected by said left and right temperature sensors.

5. The traveling drive unit for working vehicle according to claim 1, further comprising, in addition to said temperature sensor and speed sensor, a pressure sensor for detecting output pressure of said lubricant circulation pump, said motor control means being adapted to control said electric motor according to detection signals from said temperature sensor, speed sensor and pressure sensor.

6. The traveling drive unit for working vehicle according to claim 5, wherein said motor control means is adapted to turn on keep turning on said electric motor when an output pressure is higher than a predetermined reference pressure, and to turn off said electric motor when said output pressure drops below said reference pressure.

* * * * *

UNITED STATES PATENT AND TRADEMARK OFFICE
CERTIFICATE OF CORRECTION

PATENT NO. : 8,155,834 B2
APPLICATION NO. : 12/595013
DATED : April 10, 2012
INVENTOR(S) : T. Murahashi It is certified that error appears in the above-identified patent and that said Letters Patent is hereby corrected as shown below:

ON THE TITLE PAGE

Please correct claim 6, at column 28, lines 59-60 as follows:

6. The traveling drive unit for working vehicle according to claim 5, wherein said motor control means is adapted to ~~turn on~~ keep turning on said electric motor when an output pressure is higher than a predetermined reference pressure, and to turn off said electric motor when said output pressure drops below said reference pressure.

Signed and Sealed this
Tenth Day of July, 2012

David J. Kappos
*Director of the United States Patent and Trademark Office*